(12) United States Patent
Addala et al.

(10) Patent No.: US 8,402,064 B2
(45) Date of Patent: Mar. 19, 2013

(54) ORCHESTRATION OF BUSINESS PROCESSES USING TEMPLATES

(75) Inventors: Raju Addala, Fremont, CA (US); Alok Singh, Fremont, CA (US); Zeeshan Butt, Foster City, CA (US); Jhansi Munukoti, Hyderabad (IN); Himanshu Agrawal, Delhi (IN); Srinivas Pagadala, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 112 days.

(21) Appl. No.: 12/697,756

(22) Filed: Feb. 1, 2010

(65) Prior Publication Data

US 2011/0191383 A1    Aug. 4, 2011

(51) Int. Cl.
*G06F 17/30* (2006.01)

(52) U.S. Cl. .................... 707/797; 709/201

(58) Field of Classification Search ........... 707/999, 707/760, 701, 797, 806, 803, 829, 793; 717/125, 717/124, 137, 120; 709/203, 201
See application file for complete search history.

(56) References Cited

U.S. PATENT DOCUMENTS

| | | | |
|---|---|---|---|
| 5,630,047 A | 5/1997 | Wang | |
| 5,761,499 A | 6/1998 | Sonderegger | |
| 5,768,586 A | 6/1998 | Zweben et al. | |
| 5,987,423 A | 11/1999 | Arnold et al. | |
| 6,053,948 A | 4/2000 | Vaidyanathan et al. | |
| 6,341,287 B1 | 1/2002 | Sziklai et al. | |
| 6,539,386 B1 | 3/2003 | Athavale et al. | |
| 6,567,783 B1 | 5/2003 | Notani et al. | |
| 6,876,977 B1 | 4/2005 | Marks | |
| 6,915,294 B1 * | 7/2005 | Singh et al. ........................ 1/1 |
| 7,031,787 B2 | 4/2006 | Kalthoff et al. | |
| 7,096,189 B1 | 8/2006 | Srinivasan | |
| 7,139,841 B1 | 11/2006 | Somasundaram et al. | |
| 7,356,482 B2 | 4/2008 | Frankland et al. | |
| 7,379,903 B2 | 5/2008 | Caballero et al. | |
| 7,441,187 B2 * | 10/2008 | Meadows ................... 715/243 |
| 7,467,375 B2 * | 12/2008 | Tondreau et al. .......... 717/137 |
| 7,469,219 B2 | 12/2008 | Goldberg | |
| 7,472,374 B1 | 12/2008 | Dillman et al. | |
| 7,546,257 B2 | 6/2009 | Hoffman et al. | |
| 7,567,975 B2 | 7/2009 | Yalamanchi | |
| 7,574,483 B1 | 8/2009 | Alger et al. | |
| 7,590,680 B2 * | 9/2009 | Fernando et al. ........... 709/201 |
| 7,627,867 B2 | 12/2009 | Banks | |
| 7,657,534 B2 | 2/2010 | Kirkegaard | |
| 7,664,750 B2 | 2/2010 | Frees et al. | |
| 7,680,752 B1 | 3/2010 | Clune, III et al. | |

(Continued)

OTHER PUBLICATIONS

"Oracle Communications Order and Service Management™ Version 6.3", Administration Guide, First Edition, Sep. 2007.

(Continued)

*Primary Examiner* — James Trujillo
*Assistant Examiner* — Thong Vu
(74) *Attorney, Agent, or Firm* — Squire Sanders (US) LLP

(57) ABSTRACT

A distributed order orchestration system for orchestrating a business process of an order fulfillment system receives from an interface a definition of the business process and generates metadata from the definition. The system then generates an abstract syntax tree from the metadata. The tree includes a plurality of nodes and one or more of the nodes correspond to a predefined template. The system then generates executable orchestration code based on the abstract syntax tree and the predefined template.

17 Claims, 19 Drawing Sheets

U.S. PATENT DOCUMENTS

| | | | |
|---|---|---|---|
| 7,680,782 B2* | 3/2010 | Chen et al. | 707/999.004 |
| 7,873,611 B2* | 1/2011 | Ebersole | 707/701 |
| 7,987,163 B2* | 7/2011 | Keshavarz-Nia et al. | 707/694 |
| 8,028,276 B1* | 9/2011 | Bessonov | 717/124 |
| 8,141,125 B2 | 3/2012 | Maes | |
| 2002/0026339 A1 | 2/2002 | Frankland et al. | |
| 2002/0042755 A1 | 4/2002 | Kumar et al. | |
| 2002/0178014 A1 | 11/2002 | Alexander | |
| 2003/0078933 A1 | 4/2003 | Gara et al. | |
| 2003/0078944 A1 | 4/2003 | Yamauchi et al. | |
| 2003/0182145 A1 | 9/2003 | Kalthoff et al. | |
| 2004/0064351 A1 | 4/2004 | Mikurak | |
| 2004/0068526 A1 | 4/2004 | Singh | |
| 2004/0088196 A1 | 5/2004 | Childress et al. | |
| 2004/0111336 A1 | 6/2004 | Argust et al. | |
| 2004/0139176 A1 | 7/2004 | Farrell et al. | |
| 2004/0181425 A1 | 9/2004 | Schwerin-Wenzel et al. | |
| 2004/0181771 A1 | 9/2004 | Anonsen et al. | |
| 2004/0181775 A1 | 9/2004 | Anonsen et al. | |
| 2004/0267689 A1 | 12/2004 | Gavlak et al. | |
| 2005/0027732 A1 | 2/2005 | Kalima | |
| 2005/0075941 A1 | 4/2005 | Jetter et al. | |
| 2005/0096959 A1 | 5/2005 | Kumar et al. | |
| 2005/0102192 A1 | 5/2005 | Gerrits et al. | |
| 2005/0182768 A1* | 8/2005 | Waldorf et al. | 707/10 |
| 2006/0224613 A1 | 10/2006 | Bermender et al. | |
| 2006/0235733 A1 | 10/2006 | Marks | |
| 2006/0265272 A1 | 11/2006 | Bosa et al. | |
| 2007/0016608 A1 | 1/2007 | Mullins | |
| 2007/0192124 A1 | 8/2007 | Anderson et al. | |
| 2007/0203803 A1 | 8/2007 | Stone et al. | |
| 2007/0233287 A1 | 10/2007 | Sheshagiri et al. | |
| 2007/0256050 A1 | 11/2007 | Behnia et al. | |
| 2007/0260575 A1* | 11/2007 | Robinson et al. | 707/1 |
| 2007/0288412 A1 | 12/2007 | Linehan | |
| 2008/0033700 A1 | 2/2008 | Kano et al. | |
| 2008/0040245 A1 | 2/2008 | Wadawadigi et al. | |
| 2008/0046868 A1* | 2/2008 | Tsantilis | 717/136 |
| 2008/0098108 A1 | 4/2008 | Yu | |
| 2008/0098378 A1 | 4/2008 | Kilbane et al. | |
| 2008/0163164 A1* | 7/2008 | Chowdhary et al. | 717/106 |
| 2008/0256133 A1 | 10/2008 | Frankland et al. | |
| 2008/0281833 A1 | 11/2008 | Cain et al. | |
| 2009/0070783 A1* | 3/2009 | Schmidt et al. | 719/318 |
| 2009/0083632 A1 | 3/2009 | Brosh et al. | |
| 2009/0089078 A1* | 4/2009 | Bursey | 705/1 |
| 2009/0089776 A1 | 4/2009 | Sonkin et al. | |
| 2009/0150887 A1 | 6/2009 | Sanghvi et al. | |
| 2009/0171819 A1 | 7/2009 | Emde et al. | |
| 2009/0192884 A1 | 7/2009 | Lo | |
| 2009/0210268 A1 | 8/2009 | Fan et al. | |
| 2009/0216874 A1 | 8/2009 | Thain et al. | |
| 2009/0222395 A1* | 9/2009 | Light et al. | 706/47 |
| 2009/0319685 A1* | 12/2009 | Martin | 709/240 |
| 2010/0070331 A1 | 3/2010 | Koegler et al. | |
| 2010/0121740 A1* | 5/2010 | Reed et al. | 705/27 |
| 2011/0055815 A1* | 3/2011 | Squillace | 717/125 |
| 2011/0167105 A1* | 7/2011 | Ramakrishnan et al. | 709/203 |
| 2011/0184969 A1* | 7/2011 | Idicula et al. | 707/760 |

OTHER PUBLICATIONS

Oracle Data Sheet, Oracle Order Management, Copyright 2009 Oracle; pp. 1-5.

Xiaoyu Zhang and Denis Gračanin, "Service-Oriented-Architecture based Framework for Multi-User Virtual Environments", Proceedings of the 2008 Winter Simulation Conference, pp. 1-9.

Oracle®, "Oracle Fusion Middleware Developer's Guide for Oracle SOA Suite", 11g Release 1 (11.1.1) Part No. E10224-01, Chapter 31, pp. 1-25, http://download.oracle.com/docs/cd/E12839_01/integration.1111/e10224/bam_data_objects.htm.

Oracle®, "Oracle Fusion Middleware Fusion Developer's Guide for Oracle Application Development Framework", 11g Release 1 (11.1.1) Part No. B31974-03, Chapter 41, pp. 1-6, http://download.oracle.com/docs/cd/E12839_01/web.1111/b31974/adv_ads.htm.

Sterling Commerce, "Sterling Distributed Order Mangement", pp. 1-2.

Oracle®, "Oracle it Service Management Suite Overview", pp. 1-3, http://www.oracle.com/technetwork/oem/grid-control/overview/twp-oracle-it-serv-mgmt-feature-ove-133400.pdf.

Gregor Hohpe and Bobby Woolf, "Enterprise Integration Patterns; Publish-Subscribe Channel", http://www.eaipatterns.com/PublishSubscribeChannel.html.

Gregor Hohpe and Bobby Woolf, "Enterprise Integration Patterns; Point-to-Point Channel", http://www.eaipatterns.com/Point-ToPointChannel.html.

Gregor Hohpe and Bobby Woolf, Enterprise Integration Patterns; Chapter 3, pp. 57-97, http://www.eaipatterns.com/docs/EnterpriseIntegrationPatterns_HohpeWoolf_ch03.pdf.

Gregor Hohpe, "Programming Without a Call Stack—Event-driven Architectures", pp. 1-10, http://www.eaipatterns.com/docs/EDA.pdf.

Lienhard et al, Workflow and Business Rules: a Common Approach, BPTrends, Sep. 2005, ivyTeam-SORECOGroup, Switzerland.

Oracle®, "Oracle Fusion Middleware Developer's Guide for Oracle SOA Suite", 11g Release 1 (11.1.1), May 2009, Part No. E1 0224-01, Chapter 31, pp. 1-21, http://docs.oracle.com/cd/E12839_01/integration.1111/e10224/bam_data_objects.htm.

Oracle®, "Oracle Fusion Middleware Fusion Developer's Guide for Oracle Application Development Framework", 11 9 Release 1 (11.1.1), May 2009, Part No. B31974-03, Chapter 41, pp. 1-4, http://docs.oracle.com/cd/E12839_01/web.1111/b31974/adv_ads.htm.

Sterling Commerce, "Sterling Distributed Order Mangement", pp. 1-2, http://www.sterlingcommerce.com/products/multi-channel-fulfillment/order-management/Sterling+Distributed+Order+Management.htm (last retrieved Oct. 1, 2010).

Oracle®, "Oracle it Service Management Suite Overview", pp. 1-3, http://www.oracle.com/technetworkloem/grid-control/overview/twp-oracle-it-serv-mgmt-feature-ove-133400.pdf, (last retrieved Oct. 1, 2010).

Gregor Hohpe and Bobby Woolf, "Enterprise Integration Patterns; Publish-Subscribe Channel", http://www.eaipatterns.com/PublishSubscribeChannel.html (last retrieved Oct. 1, 2010).

Gregor Hohpe and Bobby Woolf, "Enterprise Integration Patterns; Point-to-Point Channel", http://www.eaipatterns.com/Point-ToPointChannel.html (last retrieved Oct. 1, 2010).

Gregor Hohpe and Bobby Woolf, Enterprise Integration Patterns; Chapter 3, pp. 57-97, http://www.eaipattern.com/docs/EnterpriseIntegrationPatterns_HohpeWoolf_ch03.pdf (last retrieved Oct. 1, 2010).

Gregor Hohpe, "Programming Without a Call Stack—Event-driven Architectures", pp. 1-10, http://www.eaipatterns.com/docs/EDA.pdf (last retrieved Oct. 1, 2010).

Bimal Mehta et al., "BizTalk Server 2000 Business Process Orchestration", Microsoft Corporation, 2001, Bulletin of the IEEE Computer Society Technical Committee on Data Engineering.

BizTalk Orchestration: A Technology for Orchestrating Business Interactions White Paper, Microsoft Corporation, Jun. 5, 2000.

ConceptWave Software Inc., "Order Management", Jul. 26, 2004.

Joan Lawson et al., "Orchestrating into End-to-End Processes", Oracle International Corporation, Mastering SOA, Part 3, Feb. 2007.

* cited by examiner

ORCHESTRATION OF BUSINESS PROCESSES USING TEMPLATES

FIELD

One embodiment is directed generally to business processes, and in particular to a computer system that orchestrates business processes for order management systems.

BACKGROUND INFORMATION

Order management systems are computer software and/or hardware systems implemented by a number of industries to facilitate order entry and processing. Companies, such as catalog companies and those utilizing electronic commerce, use order management systems to receive, process and fulfill customer orders. An order management system makes possible the entering of an order via a web-site shopping cart or data entry system. The system typically captures customer proprietary information and/or account level information for each order. Credit verification or payment processing may then be performed to check for available funds and validate the transaction. Valid orders are processed for warehouse fulfillment, including picking, packing and shipping of the ordered goods or services.

An order management system typically manages or orchestrates business processes. Business processes are typically modeled by business architects/analysts. A business process may model message exchanges with different systems in a web services environment. The business architects/analysts then provide an information technology ("IT") designer with the business model, typically in the form of a flowchart. The IT designer uses an orchestration language, such as business process execution language ("BPEL"), to code the business process. Because the IT designer and business architects/analysts have different skill sets (e.g., the business architects/analysts are familiar with the business process being modeled and the IT designer is familiar with the orchestration language but not the business process), the resulting BPEL process developed by the IT designer may not work as the business architects/analysts imagined. Accordingly, there may be a wide divide between the originally conceived business process model and the implemented model. In addition, because multiple personnel/resources are involved, the costs to model and code business processes are significant.

SUMMARY

One embodiment is a distributed order orchestration system for orchestrating a business process of an order fulfillment system. The system receives from an interface a definition of the business process and generates metadata from the definition. The system then generates an abstract syntax tree from the metadata. The tree includes a plurality of nodes and one or more of the nodes correspond to a predefined template. The system then generates executable orchestration code based on the abstract syntax tree and the predefined template.

DETAILED DESCRIPTION

Figure 1:
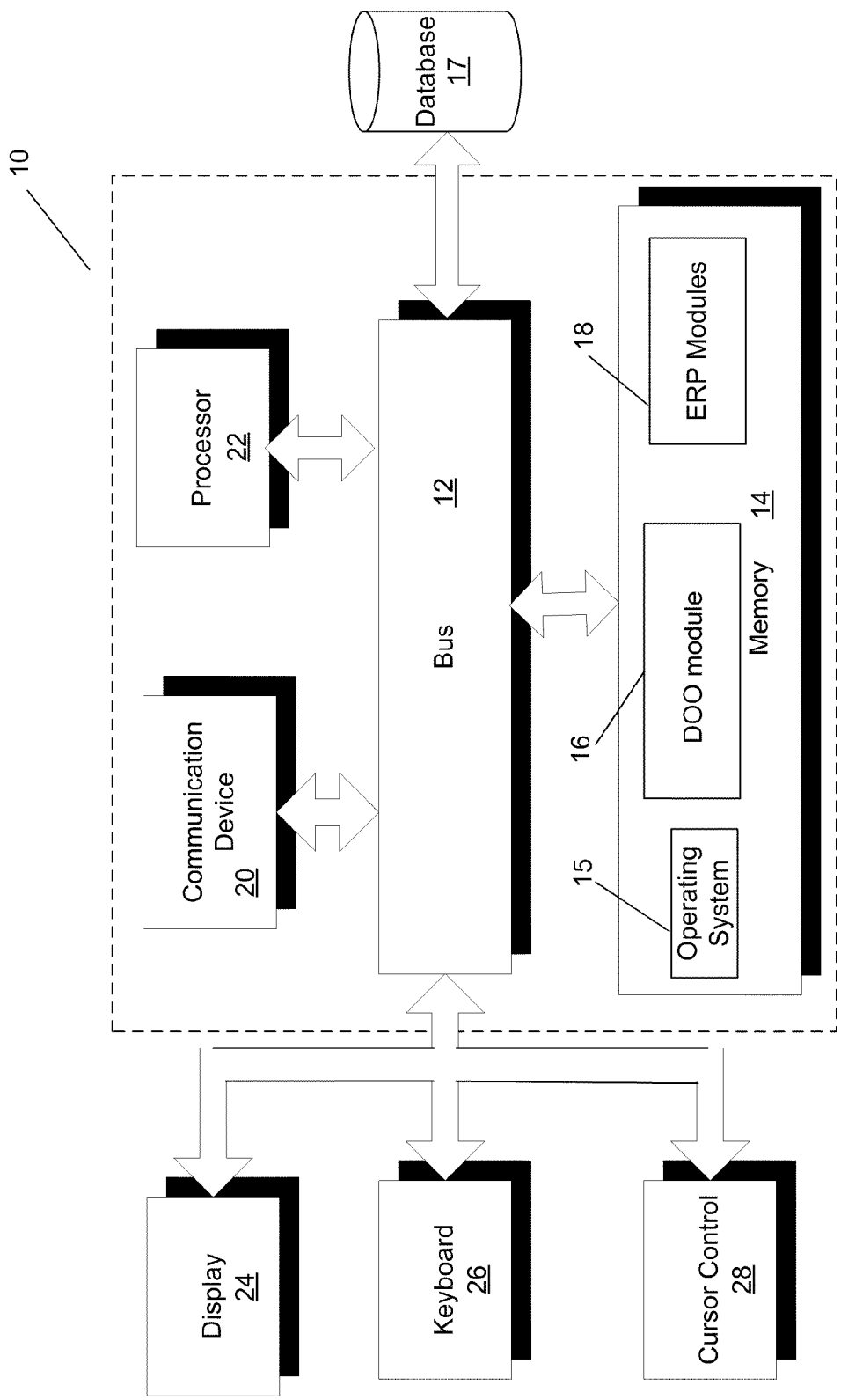
FIG. 1 is a block diagram of a distributed order orchestration ("DOO") system that can implement an embodiment of the present invention.

One embodiment is a distributed order orchestration ("DOO") system that provides pre-defined customizable templates for DOO activities and utilizes the templates in conjunction with metadata that can be created using a process definition user interface to generate a corresponding business process execution language ("BPEL") process code.

A distributed order orchestration system in accordance with one embodiment provides a flexible, configurable infrastructure that can be easily customized to be consistent with an enterprise's business practices and existing order fulfillment system architecture. In one embodiment, the distributed order orchestration system includes a capture layer for capturing customer orders across multiple channels, a decomposition layer to help determine the orchestration process, an orchestration layer for executing and orchestrating order line processing, a task layer services for performing task related logic, an external interface layer for interfacing with external systems, a fulfillment layer, and a global order promising layer to provide a user interface for scheduling and sourcing. The distributed order orchestration system may further include a fulfillment workbench layer that interfaces with the other layers of the system and manages sources, tasks and assignments. The various layers of the distributed order orchestration system combine to provide a complete order management solution at reduced implementation and maintenance costs.

One embodiment is a system that provides a high degree of abstraction for business process modeling in an order fulfillment business process that forms a portion of the distributed order orchestration system. Business processes may be modeled by users, such as business analysts, and do not need any coding from an IT designer to have the business process executed. Users are provided the flexibility to define business processes in a user interface, such as a web-based administration user interface that functions as a central location for receiving information. The business process may identify one or more services that define steps to be performed in the order fulfillment process. The process may be generated using the step definition provided by the business analyst. A run-time engine then uses the definition to dynamically invoke the services based on the definition of the business process. Predefined templates provide functionality for well defined patterns that are commonly executed in business processes.

In the business environment, business users are often process modelers, not IT personnel. By providing a web-based administration environment and predefined templates, the business users may be able to design the business process. The process definitions may be defined in business terms and not in IT terms. Embodiments allow an administrative environment outside of a code editor to be used, such as a BPEL editor, for defining processes using associated services. Users can configure processes that can be executed at runtime as executable processes without IT involvement through a single user interface. This alleviates the need for deploying the processes every time a modification of the business process is needed. The user sets up the sequence of services on a data table. The modeled business process is then used to perform an executable process, which is assembled and executed at run-time. In one embodiment, "run-time" can be defined as the time when an order is received for processing. Metadata is assembled in a data run-time table and used to define the executable process for the business process. The metadata is used to invoke services in the executable process.

In one embodiment, the services invoked are encapsulated and reusable. The metadata is used to determine how and when to invoke services. Also, depending on the metadata, input arguments are generated and sent to the services to invoke the encapsulated service. A common signature is used to send data to invoke the services. Different input arguments can be formulated for different services used in different executable processes. The input arguments are formatted in the same way such that a service can read the different sets of data and invoke the service. Thus, services can be re-used in different business processes without the need to be recoded and redeployed. Deployment of services indicates the process is ready to be released for testing or production.

FIG. 1 is a block diagram of a DOO system 10 that can implement an embodiment of the present invention. Although shown as a single system, the functionality of system 10 can be implemented as a distributed system. In general, system 10 can take and validate an order from any type of order capture system, orchestrate the order, and then fulfill the order using any type of fulfillment system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a DOO module 16 that performs the function of template based orchestration of business processes as disclosed in more detail below. System 10 can be part of a larger system, such as an Enterprise Resource Planning ("ERP") system. Therefore, system 10 will typically include one or more additional functional modules 18 to include the additional functionality. A database 17 may be coupled to bus 12 to provide centralized storage for modules 16 and 18.

Figure 2:
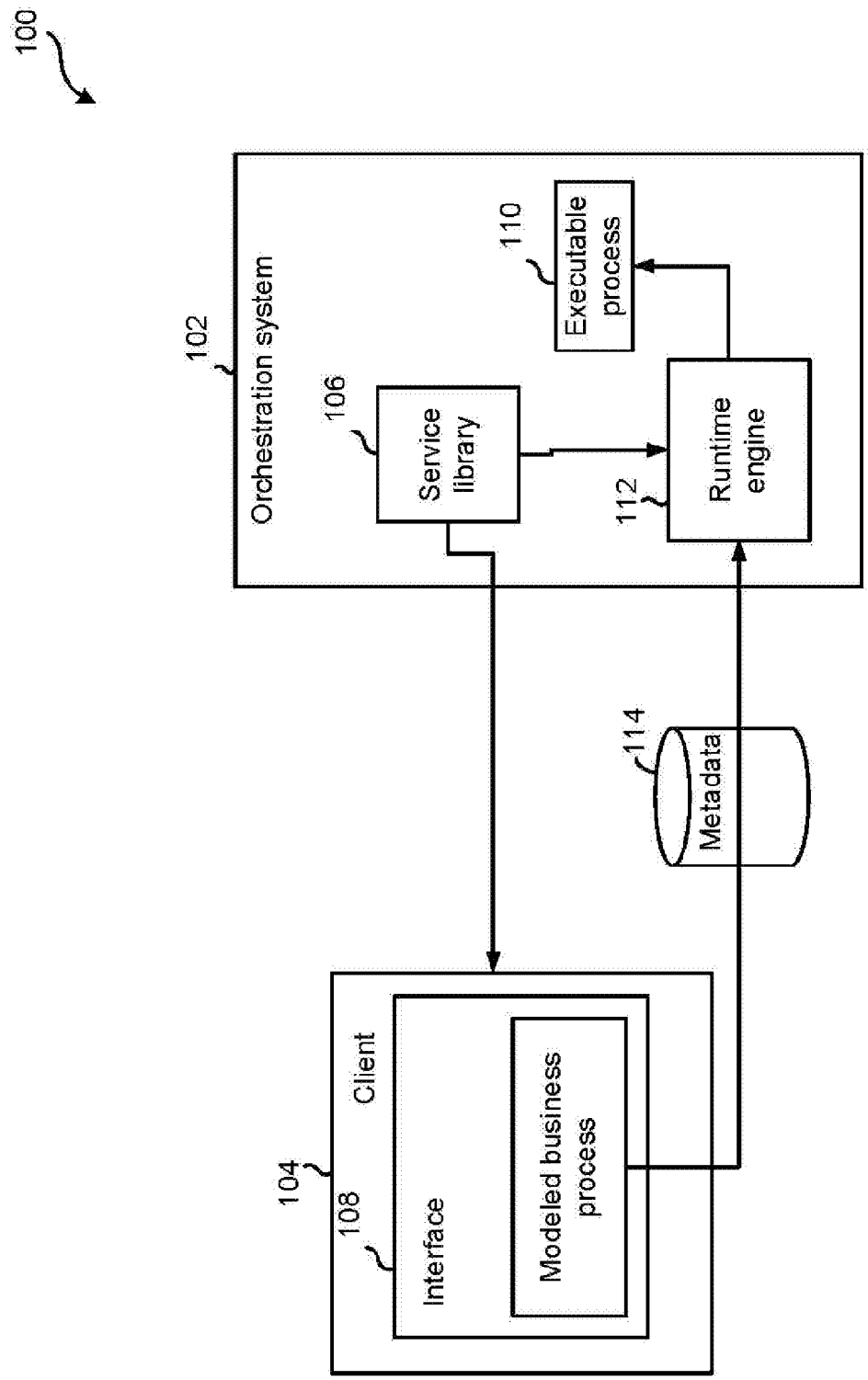
FIG. 2 is a block diagram of a system for providing an orchestration process design and authoring environment according to one embodiment.

FIG. 2 is a block diagram of a system 100 for providing an orchestration process design and authoring environment according to one embodiment. System 100 includes an orchestration system 102 and a client 104. System 102 and/or client 104 may be implemented by system 10 of FIG. 2. Although single instances of orchestration system 102 and client 104 are provided, it will be understood that multiple instances may be used. Also, orchestration system 102 and client 104 may be part of a distributed computing system. That is, functions described may be distributed among various computing devices.

Client 104 may be a computing device or set of computing devices that are configured to allow a business process to be modeled. Orchestration system 102 orchestrates the invocation and running of services for an executable process 110 for the business process. Orchestration may be the coordination and invoking of services that need to be performed in the business process. A business process may be modeled by a user. The business process is a definition of steps to be performed. The steps are defined in interface 108. An executable process is the process that is executed by run-time engine 112. The executable process includes code that is executed to coordinate performing of services.

A service library 106 includes multiple services that can be included in a business process. In one embodiment, service library 106 includes services that can be performed in an order fulfillment business process. Order fulfillment involves processes that are performed to fulfill an order. For example, an order may be received from an order capture system. The order may be for a good, service, etc. Different services may be performed to fulfill the order, such as shipment, installation, invoicing, etc. The order fulfillment process may be characterized in these different services. It is expected for any given order, some or all of these processes may need to be performed to fulfill the order. Accordingly, some embodiments create steps/code for the services that are expected to be performed in an order fulfillment process.

Services can be non-configurable units and configurable units. Nonconfigurable units are services that are built and provided to customers. The nonconfigurable units are units that likely may be used in an order fulfillment process. For example, it is expected that different services may have to be performed in the order fulfillment process, such as accounts receivable. Accordingly, these services may be modeled using a language, such as BPEL. Although BPEL is disclosed in one embodiment, it will be understand that other languages may be used.

Configurable units are services that are built and defined by a customer. For example, a wrapper is provided around a service that is configured by a user. For example, a customer may want a shipping service that is specific to the customer's company. Accordingly, the service performed by the configurable unit may be defined and built by a customer, but the wrapper allows runtime engine 112 to invoke the service automatically. This allows customers to define services that are needed for their individual organizations.

The services may be re-used in different business processes. The services are encapsulated and configured to receive a common signature for the service to be performed. For example, for each business process, different parameters may be provided (i.e., different products may be ordered for different prices, etc.). This causes different input arguments to be inputted into the service. The common signature defines a data structure that allows the service to be re-used for different executable processes 110. Thus, the same deployed service is used to process different input arguments for the different orders, but different results may be obtained. In this way, the order fulfillment process can be abstracted. Different users can define which services need to be performed without regard to how the processes are coded in an orchestration language.

Interface 108 may be an administration user interface. For example, a graphical user interface allows a user to model a business process at an abstract level. For example, service library 106 may be provided to client 104. The user may then use interface 108 to define steps of the business process using services in service library 106. A user may define a plurality of steps in the business process. Each step may be associated with a service in service library 106.

The steps may be stored in a data table, which may include metadata that may be used by runtime engine 112 to orchestrate executable process 110. The data table is shown as being stored in storage 114. It will be understood that the data table may be stored in any area, such as in client 104, orchestration system 102, or any other device. The metadata may be defined by the user, or determined from data tables, and/or orchestration rules. The user defines the sequence in which the services are to be invoked as well as conditional or parallel branching that may be required to effect the business processing rules. When the user selects a service for a process step, the user also provides additional metadata that is used to determine how the processing data is to be executed during the processing of an order at runtime. For example, conditional or parallel branching is defined. Templates that correspond to the metadata may be implemented during code generation.

At runtime, runtime engine 112 receives the metadata and uses it to determine parameters for the orchestration of executable process 110. Runtime engine 112 uses the parameters to determine which steps to perform and when in executable process 110. For example, runtime engine 112 orchestrates executable process 110 by invoking services in the series of steps that have been defined by the user. As will be described in more detail below, parallel and conditional processing of steps can also be performed and predefined templates for this processing may be used. Also, the metadata can be used to determine the input arguments used to invoke the services.

The metadata for the table is read at runtime and services are invoked, which allows changes to executable process 110 to be performed and realized at runtime automatically. Runtime engine 112 reads through each step that is defined and performs the steps. If a change in service is desired, the user may use interface 108 to add/delete/replace a service. At runtime, when the table is read, the change may be automatically performed.

Figure 3:
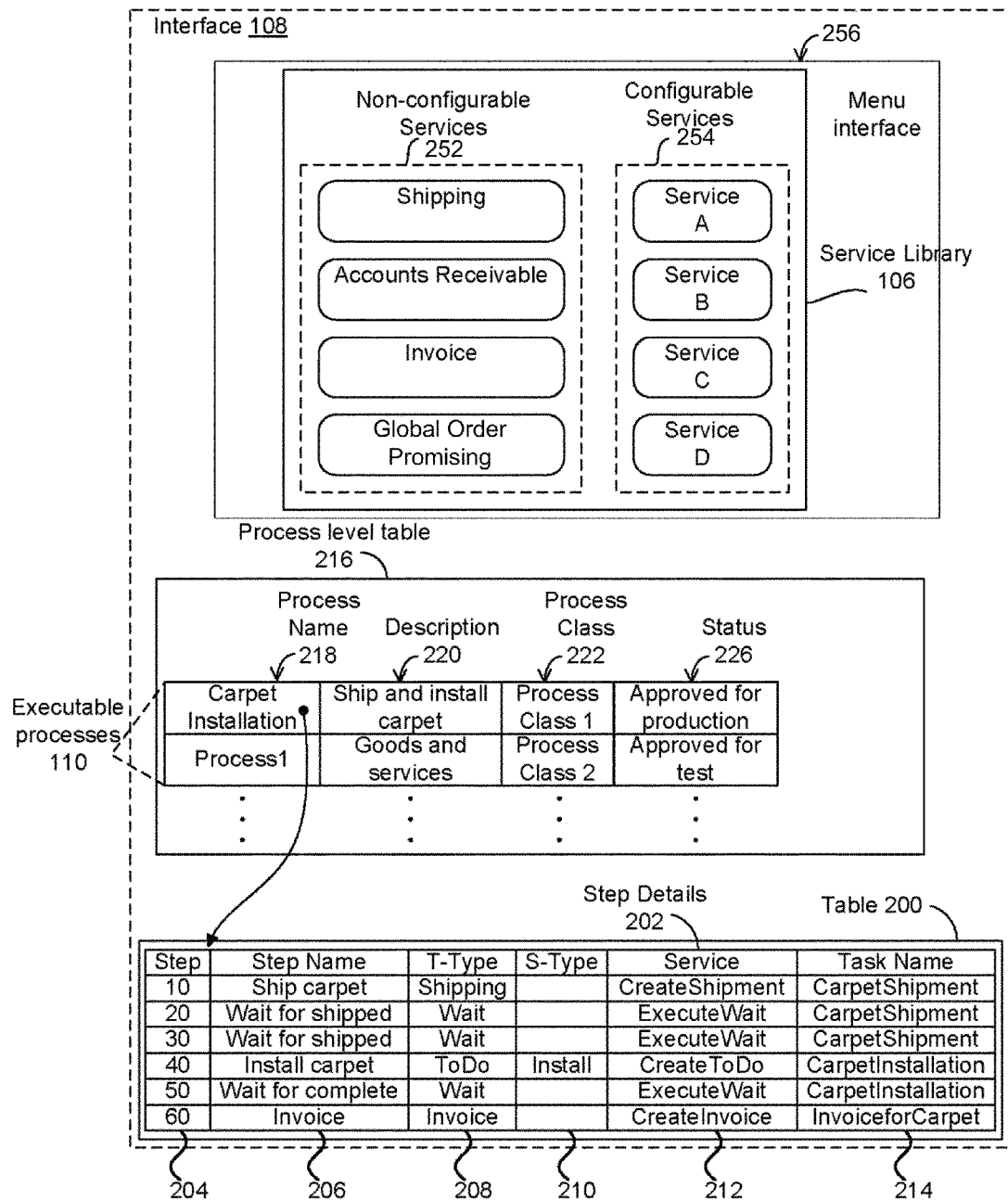
FIG. 3 is an example user interface according to one embodiment.

FIG. 3 is an example user interface 108 according to one embodiment. A process level table 216 summarizes different business processes that have been modeled. The example business processes shown in FIG. 3, "Carpet Installation" and "Process1" shown at 218 have been modeled by a user and provide the functionality of ordering and installing carpet.

In process level table 216, a process name column 218 shows that a carpet installation business process and process1 have been modeled. A description column 220 describes the process. A process class column 222 describes the class of the process. A status column 226 is the status of the executable process. There may be different statuses of executable processes 110. For example, some business processes may be approved for production, approved for test, or may be new. Production means that the service is approved for regular business use, approved for test is approved for testing, and new is a service in development.

A business process in table 216 can be selected and a data table 200 may show the step details for individual business processes. In FIG. 3, the "Carpet Installation" process has been selected and data table 200 shows details of each service that has been defined for the Carpet Installation.

In data table 200, a step column 204 identifies the steps in the business process. For example, steps 10-60 are provided. Services for these steps may be performed at runtime. The steps may be run in sequence from top to bottom (or in any other order). In this case, a step 10 is performed and when finished, a step 20 is performed, and so on. Additionally, although not shown, conditional and parallel steps may also be defined using interface 108. Conditional steps are steps that depend on a result occurring (e.g., another step finishing) and parallel steps are performed in parallel. A user defines whether steps should be conditional or parallel.

Step name column 206 provides a descriptive name for the steps. For example, "ship carpet", "wait for shipped", "install carpet", "wait for complete", and "invoice steps" are provided. A task type column 208 describes what type of task is being performed. For example, for the ship carpet task, an external system may perform a shipping task and for the invoice step, an invoice system may invoice for a bill.

A service column 212 identifies the service associated with the step. A task name column 214 is the name of the task. For example, these tasks have to do with carpet and are named "carpet shipment", "carpet installation", and "invoice" for carpet. It is possible that if something other than a carpet is being installed, the task name may be different. For example, a sink shipment, sink installation, and invoice for sink may be the names of these tasks.

Users may use interface 108 to generate data table 200. A user may select services from a menu for service library 106. For example, a user uses a menu interface 256 to select services from service library 106. Drop-down menus, drag-and-drop options, and other visual processes may be used to define executable process 110. Users are provided with an orchestration-specific interface that presents the business process data with suitable validations, rather than being required to learn the complexities of a multipurpose IT development environment. This allows a user to model a business process in an abstract manner, but have executable process 110 be generated and executed from the model.

The services in service library 106 may be made up of non-configurable units and configurable units. For example, non-configurable units are provided in a column 252 and configurable units are provided in a column 254. As shown, services that are non-configurable include shipping, accounts receivable ("AR"), invoice, and global order promising ("GOP"). Also, configurable units are designated as A, B, C, and D.

Table 200 is generated as shown in interface 108 using menu 256. Table 200 is associated with metadata that describes the services to be performed and any arguments that are needed to invoke the services. Further, the metadata may be used to call/reference predefined templates as disclosed in more detail below.

Figure 4:
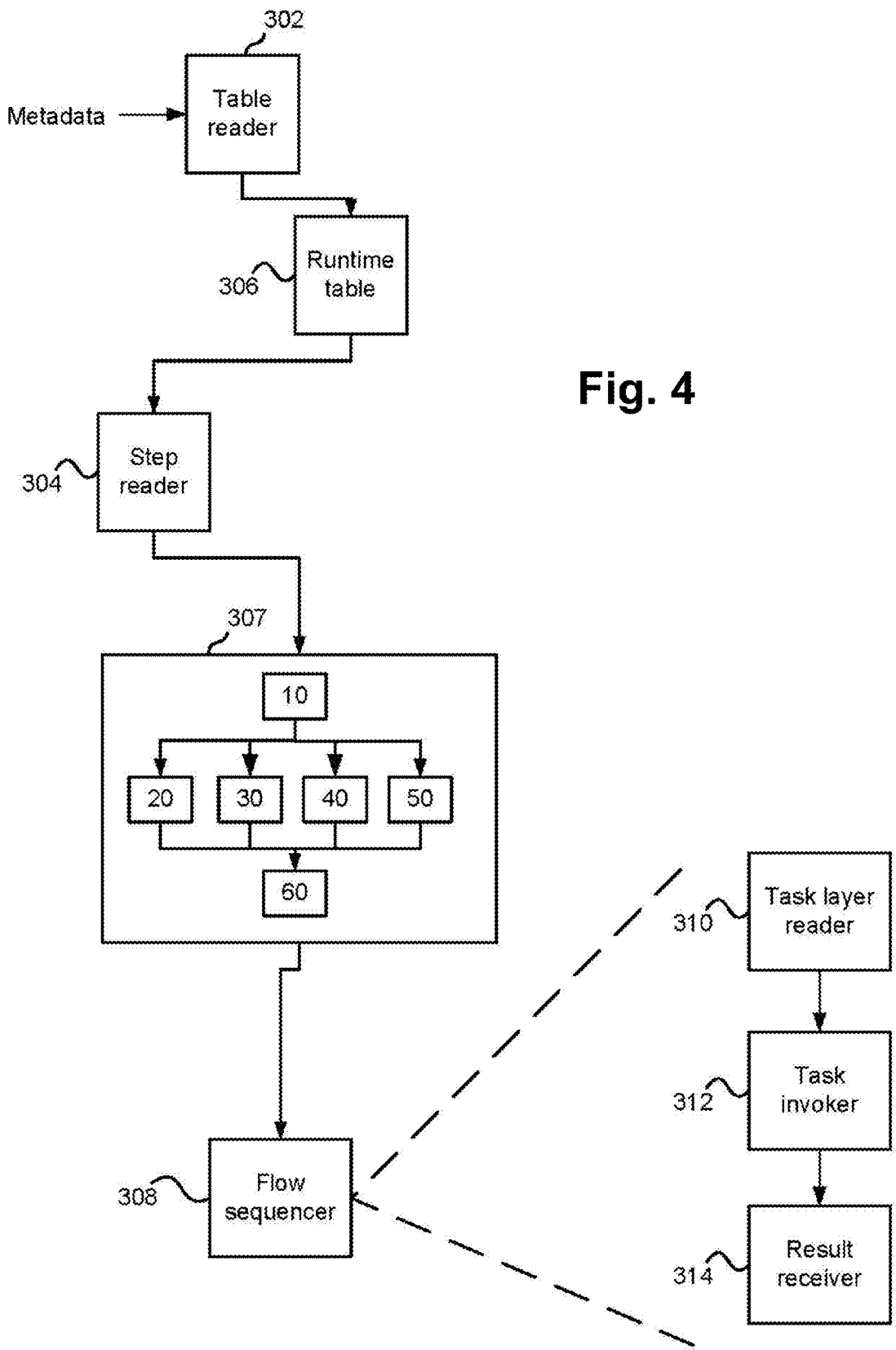
FIG. 4 is a block diagram of the runtime operation according to one embodiment.

Once the business process is modeled in interface 108 and released by setting the process status, runtime engine 112 is used to orchestrate the invocation of the services. FIG. 4 is a block diagram of the runtime operation according to one embodiment. A table reader 302 receives metadata from interface 108 defining the business process. Table reader 302 may copy the data to a runtime table 306 but this is not necessary.

During runtime, a step reader 304 is configured to read the steps in runtime table 306. Step reader 304 may analyze the metadata and determine which steps should be executed and when. For example, step reader 304 checks to see if parallel or conditional branching is associated with a step. The metadata is also used to determine input arguments for the services. The input arguments may be determined from the metadata, from data in lookup tables, or determined using rules.

Step reader 304 may assemble executable process 110 using encapsulated services from service 106 and the metadata. For example, code for each service that was modeled in the steps is determined for executable process 110. The input arguments for each service are also determined. For example, the metadata is used to determine the input arguments such that the services can process an order for the business process. Also, any partner links are determined using the metadata to allow the services to interact with external systems. Executable process 110 is assembled based on the definition of steps in the business process. Because services are reusable, the same code for a service can be used for different business processes. However, the input arguments or partner links may be different. Because the same code is re-used, automatic assembly of executable process 110 is provided.

A flow sequencer 308 is used to dynamically invoke the steps at the appropriate time based on executable process 110. As shown, a step 10 may determine a service to invoke. One of steps 20, 30, 40, and 50 are then performed. Step 60 then determines if other steps need to be performed. In this case, one of the other steps in 20, 30, 40, and 50 could be performed. Flow sequencer 308 may determine relevant input arguments depending on the content of the metadata received. These input arguments are then used to invoke a service. For example, flow sequencer 308 may include a task layer reader 310 that determines a service to invoke. A task invoker 312 then dynamically invokes the service. Any input arguments are used to invoke the service. In invoking the service, code for the encapsulated service is executed to coordinate performing of the service. For example, the executed code may prepare and send a message to an external system to perform the service.

The service may then be performed and the result is received at result receiver 314. In one example, if the task is shipping, then a shipping service generates a message for a shipping system regarding the shipping of a good. Once the shipping system ships the good, a message is returned to the shipping service, which stores the result.

After receiving a result, it is then checked whether further sequences need to be performed. For example, a while activity module checks to see whether further services need to be processed. For example, the process may be returned to flow sequencer 308 to allow for dynamic invocation of other steps in the process. Also, the while activity module may wait until parallel branches are completed.

Accordingly, the information required to invoke the services is determined automatically based on the runtime table. In one example, in BPEL, necessary partner links for all invocations have been created and are used to invoke the services. The services represented in the BPEL partner links are deployed BPEL processes that require no further configuration in order to be used in multiple business process definitions. When a service is invoked by the runtime engine, the corresponding partner link is accessed in the underlying BPEL process. Assembly of a service and modification of any service take place through the use of the metadata found in the runtime table and may be managed through interface 108.

Accordingly, a user can set up the steps in a business process. Executable process 110 can be automatically assembled at runtime. The code used in executable process 110 is not generated by the user who set up the business process. Rather, metadata can be defined and is used to assemble encapsulated services for executable process 110.

Figure 5:
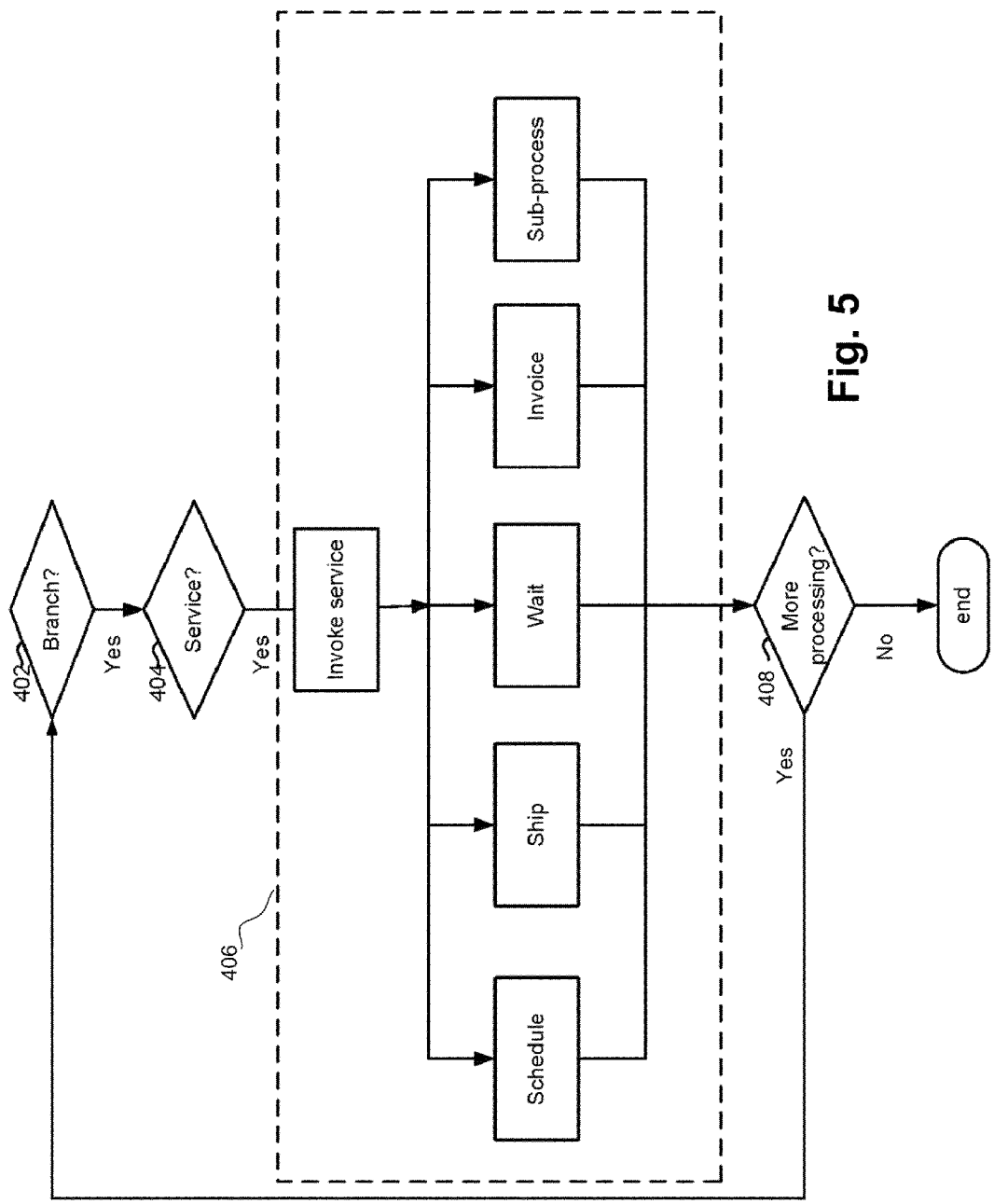
FIG. 5 is a flow diagram of an example of invocation of services using a flow sequencer according to one embodiment.

FIG. 5 is a flow diagram of an example of invocation of services using flow sequencer 308 according to one embodiment. At 402, it is determined if branching is needed. If a conditional statement is encountered, the process proceeds down the appropriate branch based on which condition is satisfied. If parallel branching is encountered, parallel flow sequence instances are spawned to carry out the additional branches. The branching is determined and used later in invoking services. The process then proceeds to 404 in which a service is determined.

Various services may then be performed. The steps in the example of FIG. 3 include an invoke service step, schedule step, ship step, wait step, invoice step, and sub-process step. Identical processing sequences can flow in parallel until a unifying step is reached. Each flow sequence contains the same underlying coded process (such as a BPEL process), but different processing sequences can be used in different executable processes 110. That is, one sequence may contain Schedule, Ship, Invoice while another may contain Schedule, Activity, Ship, Activity, Invoice, although the runtime engine including the underlying coded processes do not change. That is, the code for each service that is invoked stays the same even though different executable processes are being run.

An external service invocation is contained in each branch of the flow sequencer, one branch for each service that can be invoked. The branch contains all the steps necessary to set up the data that should be included in the message to the specific external service and to format the response received from the service. Once a service is complete, the while activity module checks to see if there are further services to process and either returns to flow sequencer 308, continues to the next step in the process or waits until any parallel branches are complete.

Box 406 shows a conceptual execution of executable process 110. Not all steps may be run at once. For example, the invoke service is invoked for step 10 and determines a service to invoke. Once that is completed, at 408 it is determined if other steps need to be performed. In the example of FIG. 5, at 404 it is determined the Schedule, Ship, Wait, Invoice, and subprocesses services should be performed. Once all the flows have been completed, a uniform set of results can be constructed. Based on the definition of the executable process, it is determined if additional processing should be performed. Different branches are performed where each branch invokes the associated service. Input arguments for the service are generated from the metadata in the runtime table. When the selected service has been performed, 408 determines if additional services should be performed. If so, the process continues at 402. If not, the process ends.

Figure 6:
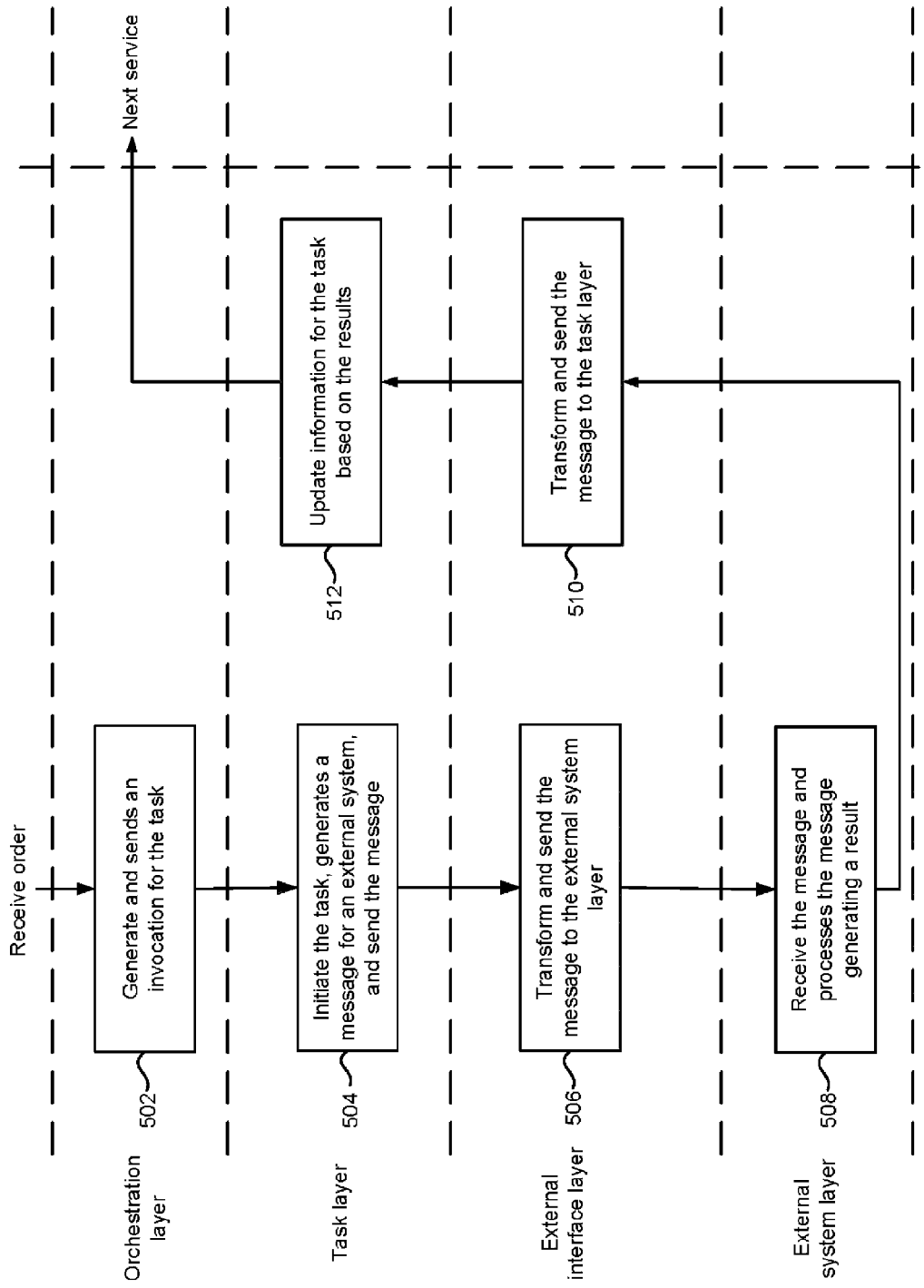
FIG. 6 illustrates a process for orchestration data flow among different layers according to one embodiment.

The orchestration of services is provided using information from table 200 of FIG. 3. However, in addition to orchestration, services need to communicate with external systems. FIG. 6 illustrates a process for orchestration data flow among different layers according to one embodiment. An orchestration layer, task layer, external interface layer, and external system layer is provided. Not shown is a decomposition layer that receives an order from an external order system and translates it to the order format and order content required by the layers shown in FIG. 6.

502 generates and sends an invocation for the task. An order may be received from an type order capture system. This may cause a task to be invoked. The invocation request is generated using data found in the runtime table. The request is sent to the task layer.

504 initiates the task, generates a message for an external system, and sends the message. The message generated indicates which task should be performed by the external system. The task to be performed is an aspect of order processing that has been modeled. For example, the task may be invoicing for an order. Parameters for performing the task are also included. The message is sent to an external interface.

506 transforms and sends the message to the external system layer. The messages generated by the task layer may be in a generic format. Different external systems, however, may communicate using other formats. The external interface layer determines the format used by an external system and transforms the message. For example, metadata defined by a user may be used to determine the format to be used. In one example, mappings to what external systems call a product that was ordered are used to translate the message.

508 receives the message returned by the external system and processes the message generating a result. The external systems may be systems that perform the task related to processing an order, such as a scheduling system, shipping system, etc. When the task is performed, the result of the task is determined. The result may be a date when a shipment is scheduled, a date when a good is shipped, etc. The result is then sent back to the external interface layer.

510 transforms and sends the message to the task layer. 512 updates information for the task based on the results. For example, the results may be stored in a table or database. The process then continues to the next service that can be invoked.

As disclosed, the generation of BPEL or other type of coded business processes does not occur for each order in the order orchestration system. Instead, the code typically occurs only during setup/implementation or during process changes. Once generated, the same process definition is reused over several orders. Subsequent changes to the deployed process will be redeployed with a new version and will be picked up by new orders.

Figure 7:
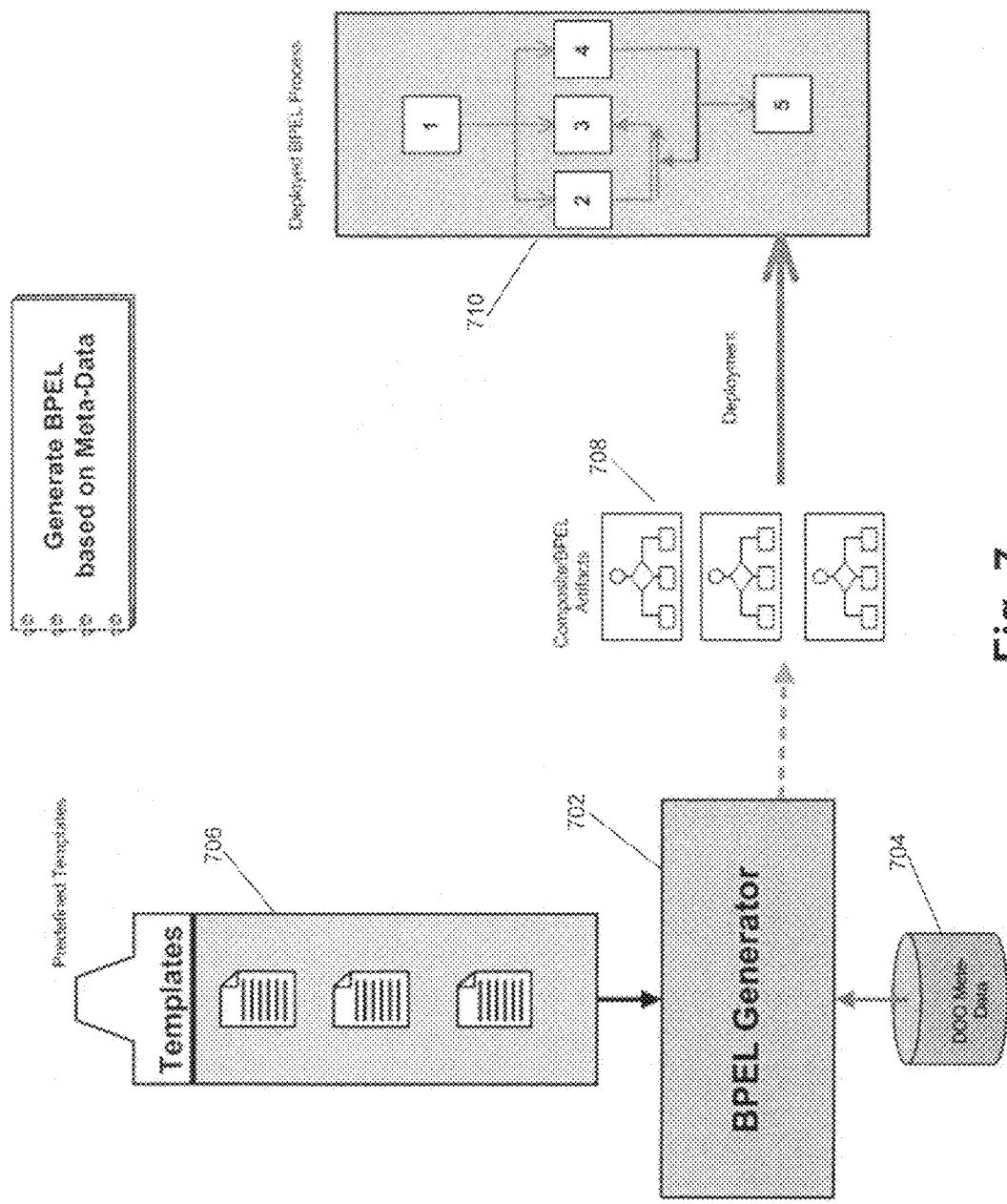
FIG. 7 is a block diagram illustrating the generation of business process execution language ("BPEL") processes using templates and metadata in accordance with one embodiment.

In one embodiment, pre-defined templates are used for generating the BPEL processes of common constructs such as invoke, switch, split and flow. In this embodiment, the templates replace the functionality of step reader 304 and flow sequencer 308 of FIG. 4, and the functionality of FIG. 5. FIG. 7 is a block diagram illustrating the generation of BPEL processes using templates and metadata in accordance with one embodiment. A BPEL generator 702 receives as input metadata 704 and templates 706. In one embodiment, metadata 704 is generated as a result of user interaction with a user interface such as interface 108 of FIG. 2. Templates 706 are predefined to coincide with defined business process patterns such as invoke, switch, flow and split. BPEL generator 702 then generates composite/BPEL artifacts 708 which in one embodiment are Extensible Markup Language ("XML") based documents. Deployed BPEL processes 710 are then generated which can be executed at run time.

Figure 8:
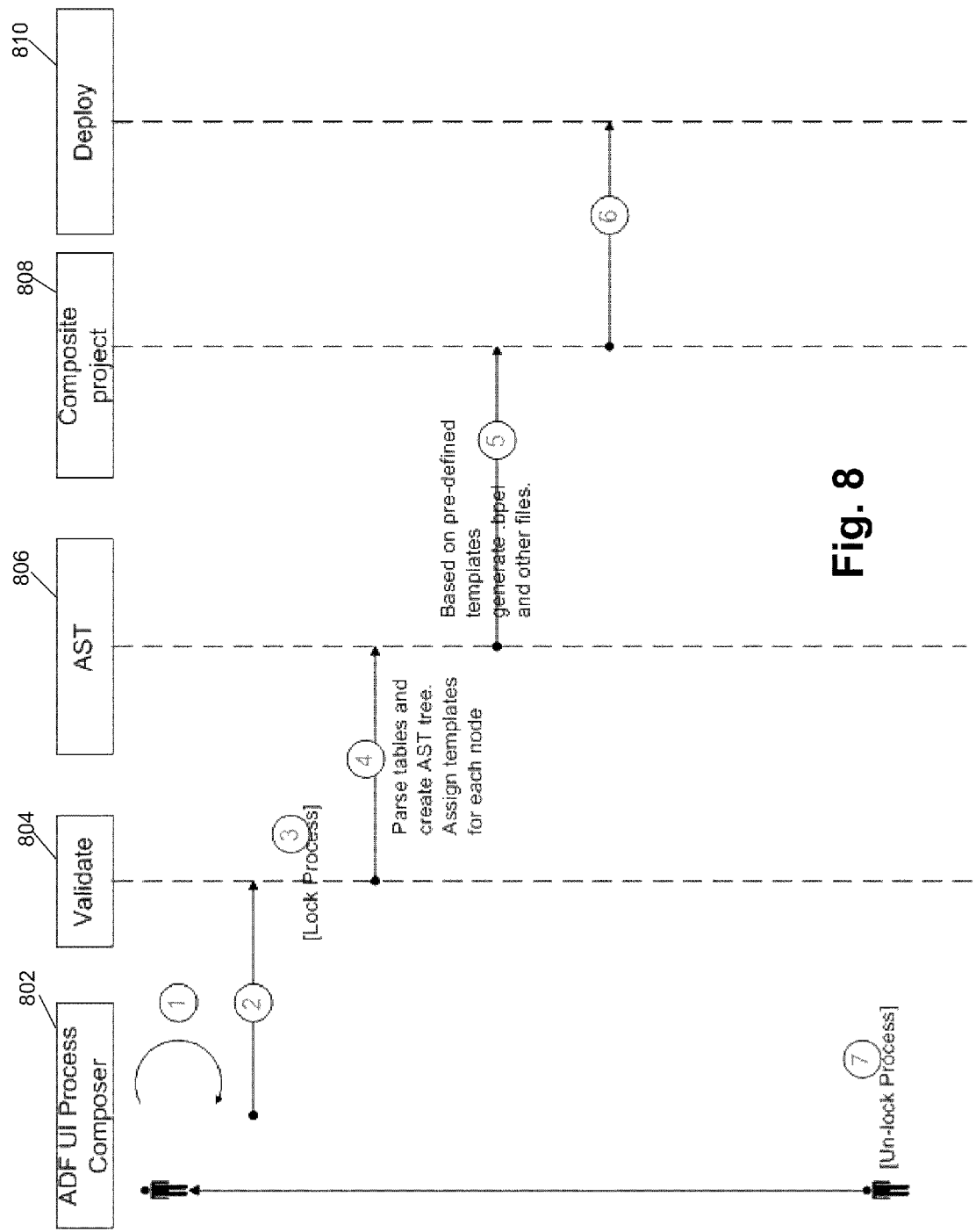
FIG. 8 illustrates functionality in accordance with one embodiment to generate a BPEL process based on metadata and templates.

FIG. 8 illustrates functionality in accordance with one embodiment to generate a BPEL process based on metadata and templates. At 802, a business analyst uses a user interface such as interface 108 of FIG. 2 to graphically model the business process and generate metadata. The process definition is stored in a database. At 804, the business analyst is done with the design and selects a validate button. This action validates the process definition as per DOO functionality and process grammar. If the process is valid, the process is locked to prevent further changes.

At 806, the metadata/tables are parsed and an Abstract Syntax Tree ("AST") is generated. An AST is a hierarchal in-memory data structure that represents the BPEL process. Based on the metadata, a pre-defined template is associated and assigned for each AST node (i.e., executable step in the process) as appropriate.

At 808, a BPEL Generator (i.e., file writer) reads the AST and generates a BPEL XML file based on the node types in the AST. It creates a copy of a service oriented architecture ("SOA") composite project template, and compiles the project and generates a deployment profile.

At 810, the BPEL process is dynamically deployed to the SOA container. Later, if the business analyst needs to edit the process, the process will be unlocked functionality returns back to 802.

Figure 9:
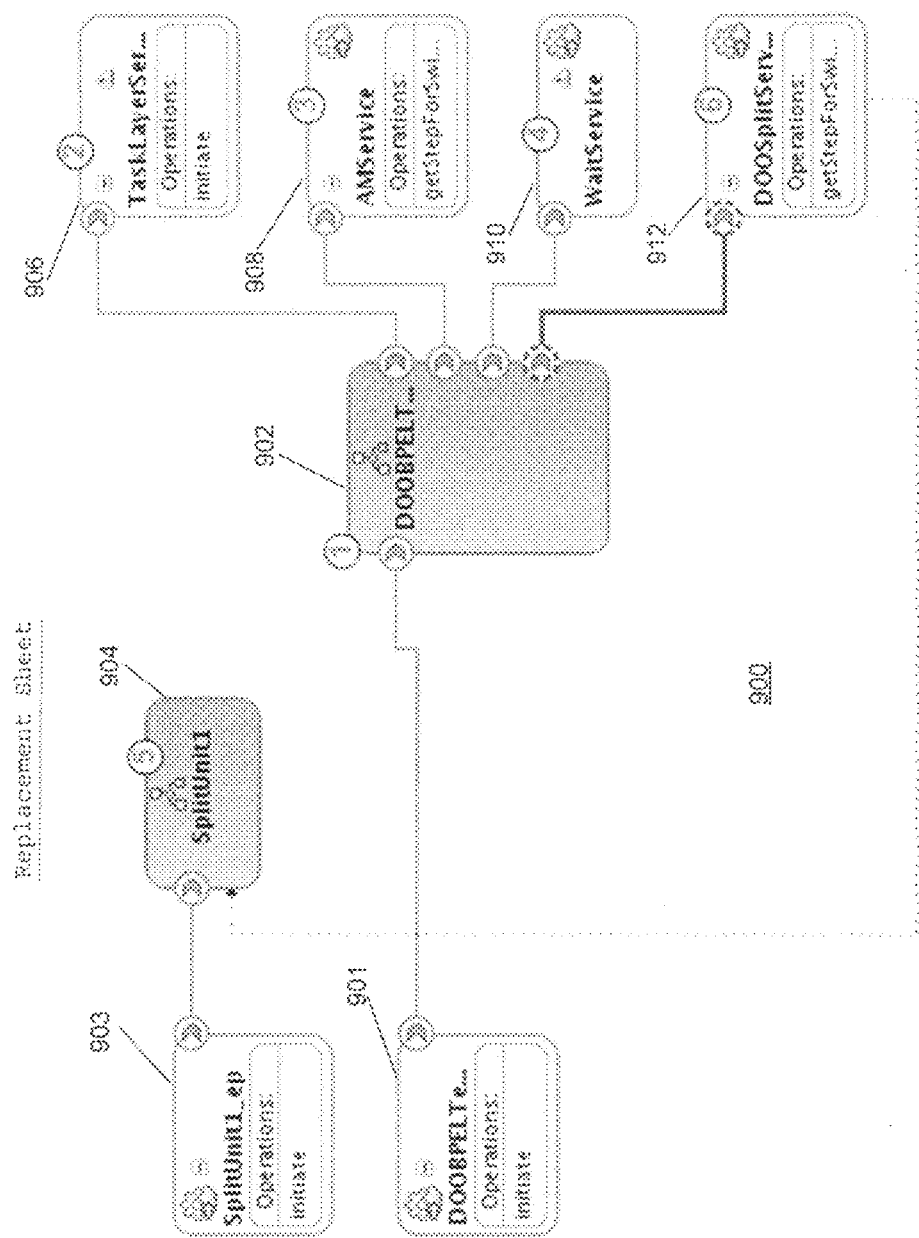
FIG. 9 is a block diagram of a composite template in accordance with one embodiment.

FIG. 9 is a block diagram of a composite template 900 in accordance with one embodiment. A composite is an assembly of services, service components, and references designed and deployed together in a single application. The composite template is a collection of DOO artifacts.

Template 900 includes "DOOBPELtemplate" executable BPEL process 902 which is the main orchestration business process or Orchestration Manager ("OM") that orchestrates the order. Process 902 is generated as per the process definition. It involves a sequence of invocations of Task Layer Services ("TLS") which are the services that are responsible for executing a secondary task. Module 901 is an entry point (i.e., used to invoke) for process 902.

Service 906 is called by process 902 and is the partner link for the wrapper TLS. This service may be responsible for (a) Routing the request to the appropriate Task Layer Service; (b) enriching the payload as and if required; (c) placeholder for checking step effectiveness; (d) saving the set of attributes for processing change requests; and (e) while processing change, attempting to reuse step information from the previous process instances.

Service 908 is called by process 902 and is a co-located application module ("AM") service that is responsible for: (a) integrating with business rules and determining which switch case to invoke; and (b) checking Delta while processing change requests. Service 910 is called by process 902 and is a generic wait service that the OM uses for pausing and resuming the process. Process 904 is a set of "split services" that are generated as per the process definition and are executable BPEL processes. Module 903 is an entry point for process 904. Although in one embodiment the number of split units can vary, the main OM does not invoke them directly. For split units, the OM will invoke a seeded DOO split service 912. DOO split service 912 manages the split logic and completely encapsulates the logic from the OM. A split unit separates a BPEL process in the composite, with each split unit acting as a single step in the generated process.

Figure 10:
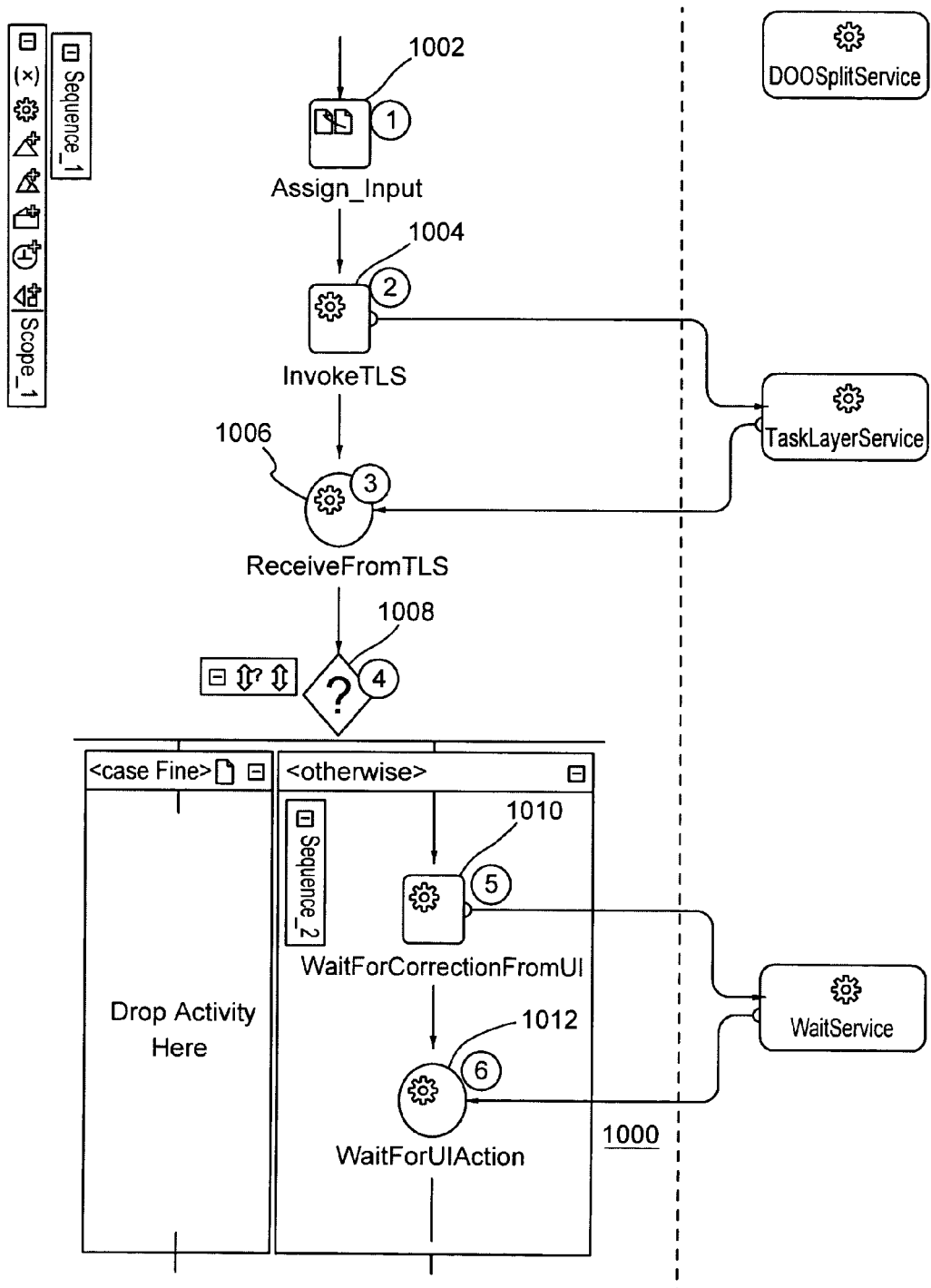
FIG. 10 is a block diagram of an invoke template in accordance with one embodiment.

FIG. 10 is a block diagram of an invoke template 1000 in accordance with one embodiment. Template 1000 is used to invoke a TLS.

At 1002, Task specific information (e.g., group id, step number) is assigned based on metadata.

At 1004, the Task Layer Service is invoked. In one embodiment, one of the invoked wrapper service is either service 906, 908, 910 or 912 of FIG. 9.

At 1006, the response from the TLS is received.

At 1008, the response is examined and determined if the invoked TLS is successful.

At 1010, if the response has an error code, the process is paused and the OM waits for manual intervention from the DOO workbench (i.e., UI 108 of FIG. 2).

At 1012, in response to a retry request, the process is resumed at 1002.

Figure 11:
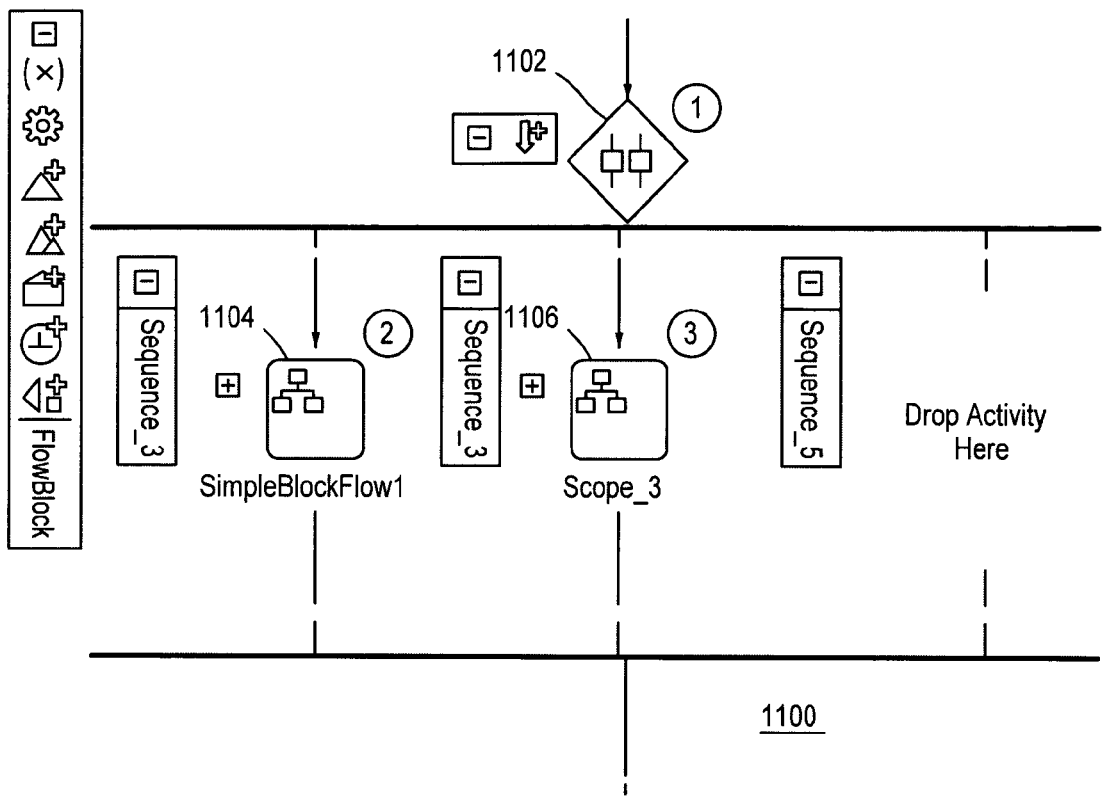
FIG. 11 is a block diagram of a flow template in accordance with one embodiment.

FIG. 11 is a block diagram of a flow template 1100 in accordance with one embodiment. Template 1100 is used to implement code for parallel processing.

Module 1102 represents the BPEL flow construct.

Modules 1104 and 1106 represent the sequence of steps performed in parallel. Invoke template 1000 can be embedded to implement the steps.

Figure 12:
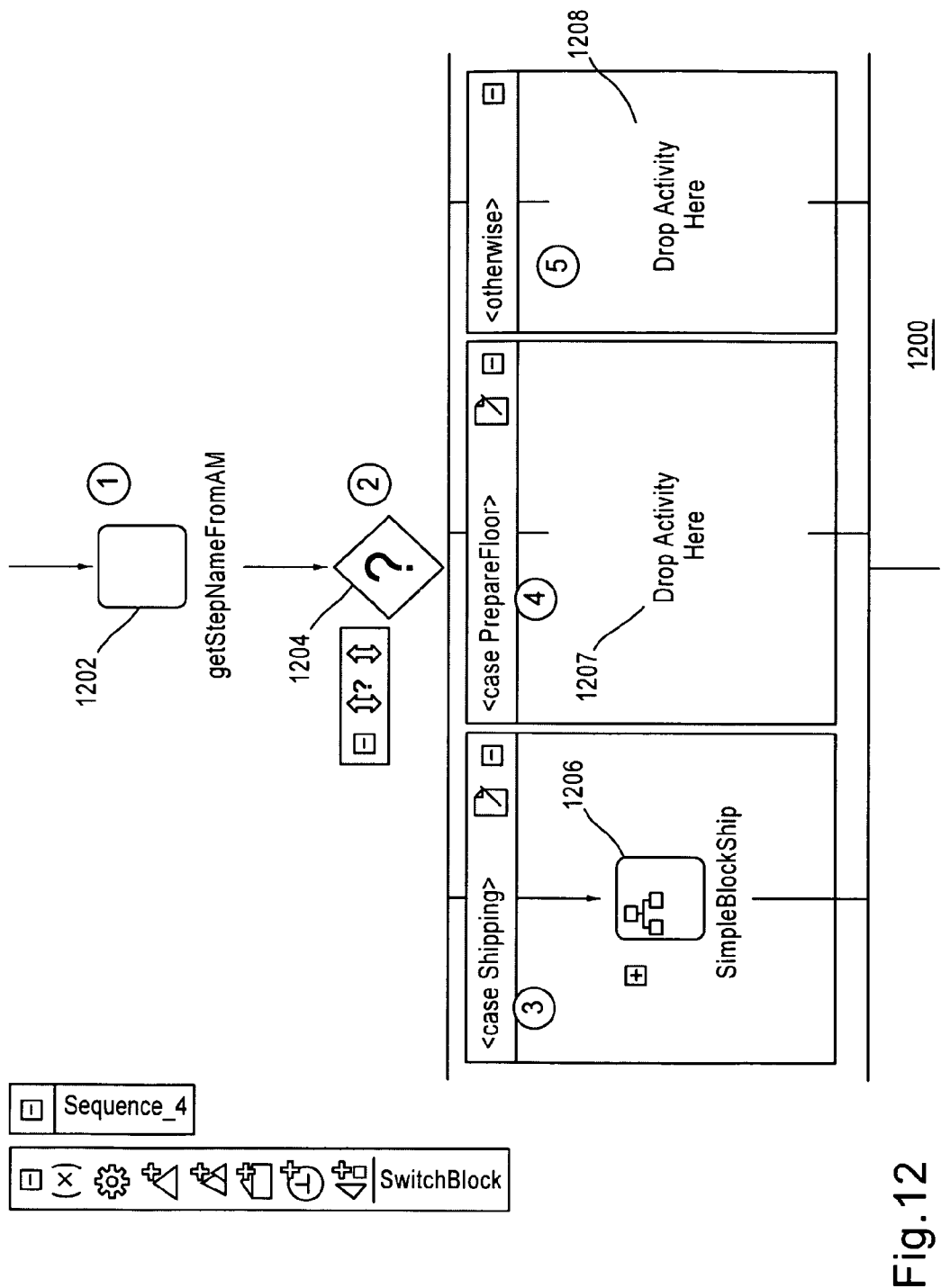
FIG. 12 is a block diagram of a switch template in accordance with one embodiment.

FIG. 12 is a block diagram of a switch template 1200 in accordance with one embodiment. Switch template 1200 provides the functionality of conditional branching.

At 1202, a co-located AM service is invoked that returns a step name. The AM service makes a call to a business rules library which dictates which steps to execute.

1204 is the BPEL switch construct which determines which branch to take based on the business rules.

1206-08 are embedded invoke templates for each switch case condition based on the process step name as per the process definition. Depending on the business rules, steps at 1206, 1207, or 1208 will be invoked.

Figure 13:
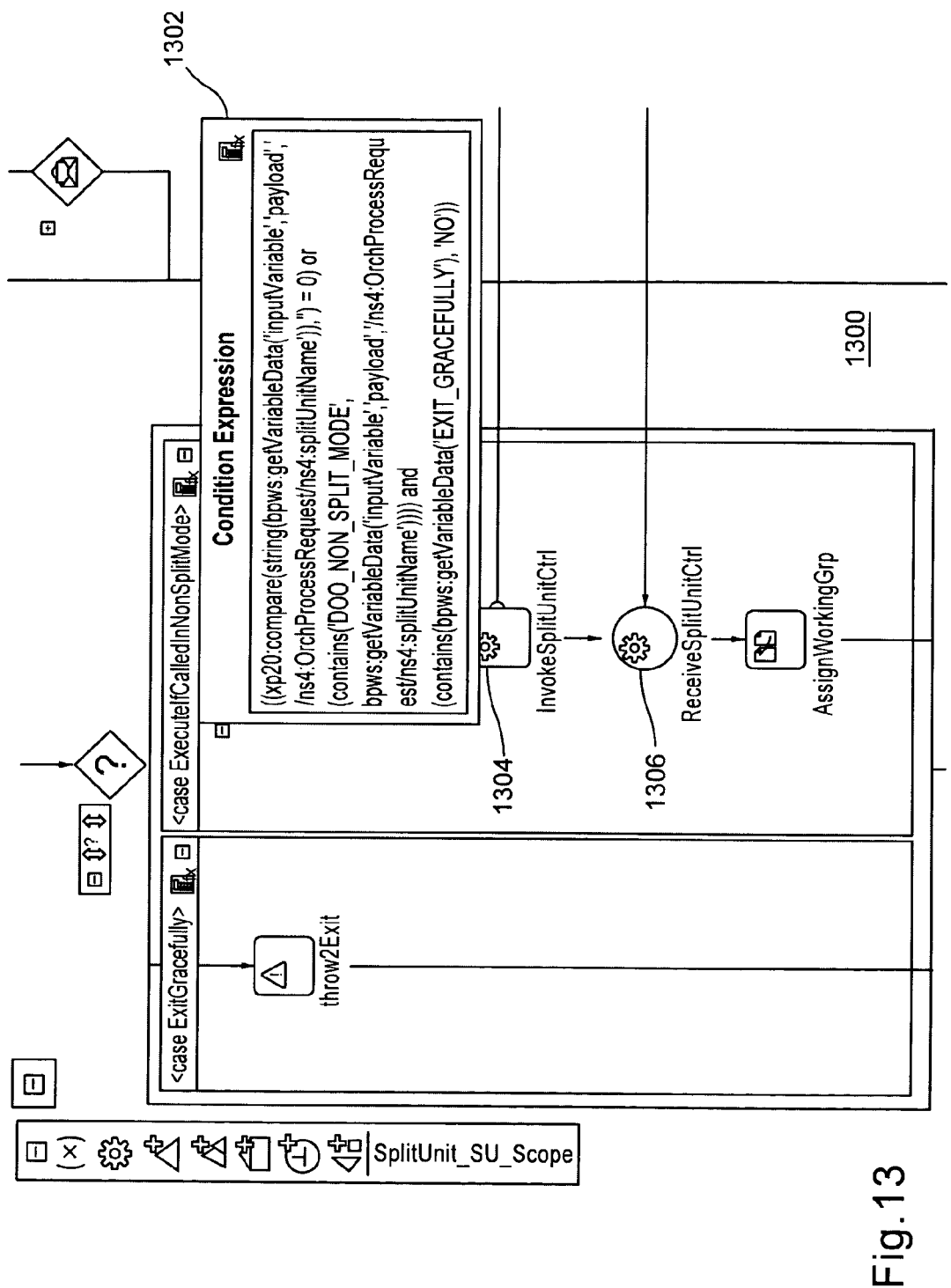
FIG. 13 is a block diagram of a split template in accordance with one embodiment.

FIG. 13 is a block diagram of a split unit or "split" template 1300 in accordance with one embodiment. A split is a splitting of a fulfillment. For example, if an order to be fulfilled is 5 identical books, but 3 of the books are located in a Seattle warehouse, and 2 of the books are located in a San Francisco warehouse, the tasks will be split into two units. Split unit 1300 includes a conditional expression 1302 that include logic to determine whether to execute a split unit and is invoked at invoke split unit control 1304. If a split unit is executed, control returns at 1306, and the split unit is executed.

"Change management" refers to the functionality to manage change requests while processing and fulfilling orders. A change request comprises a new order that references the original order. The new order also comprises modifications to the original order, and thus, comprises modifications to business steps that comprise a business process. Therefore, a change request may cause significant alternation to the business process (and thus, the corresponding executable process) that is currently underway. A process transaction is insufficient to process change requests because several of the business steps of a business process interact with external fulfillment systems, and thus, go beyond the transaction boundary. Therefore, these business steps require special logic to accommodate change requests.

According to an embodiment of the invention, the distributed order orchestration system is able to receive a change request and determine the modifications between an original order and a new order (also referred to as "a modified order"). The modifications between the original order and the new order can then be used to determine what business process changes are necessary to respond to the change request. Thus, the system is able to cope with cases where the steps of the new business process is in conflict with steps of the original business process that are underway or that have already been completed. In addition to automatically adjusting past business steps of the original business process, the distributed order orchestration system is able to incorporate changes to business steps that have yet to be executed.

Figure 14:
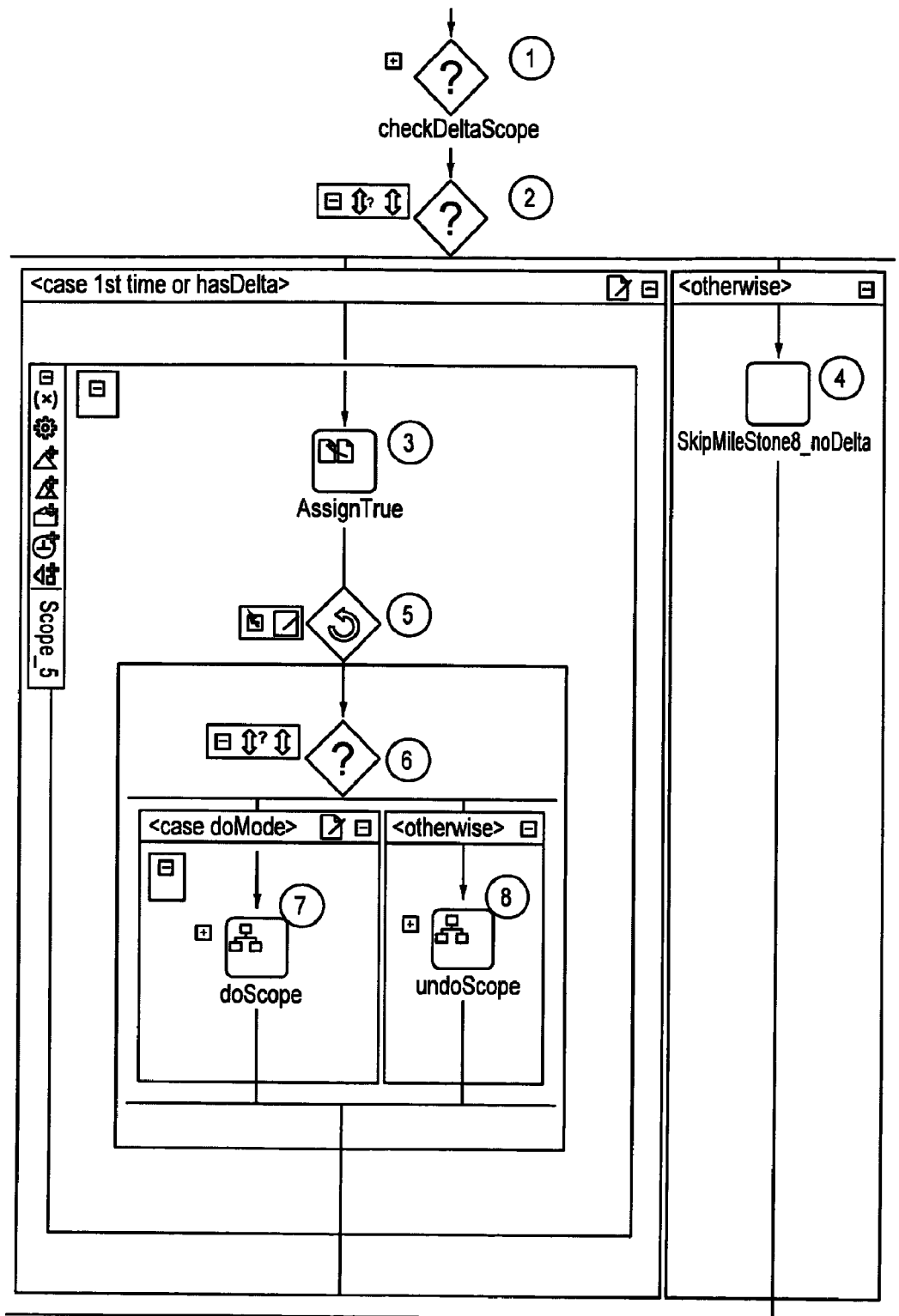
FIG. 14 is a block diagram of an extension of the invoke template for change management in accordance with one embodiment.
Figure 15:
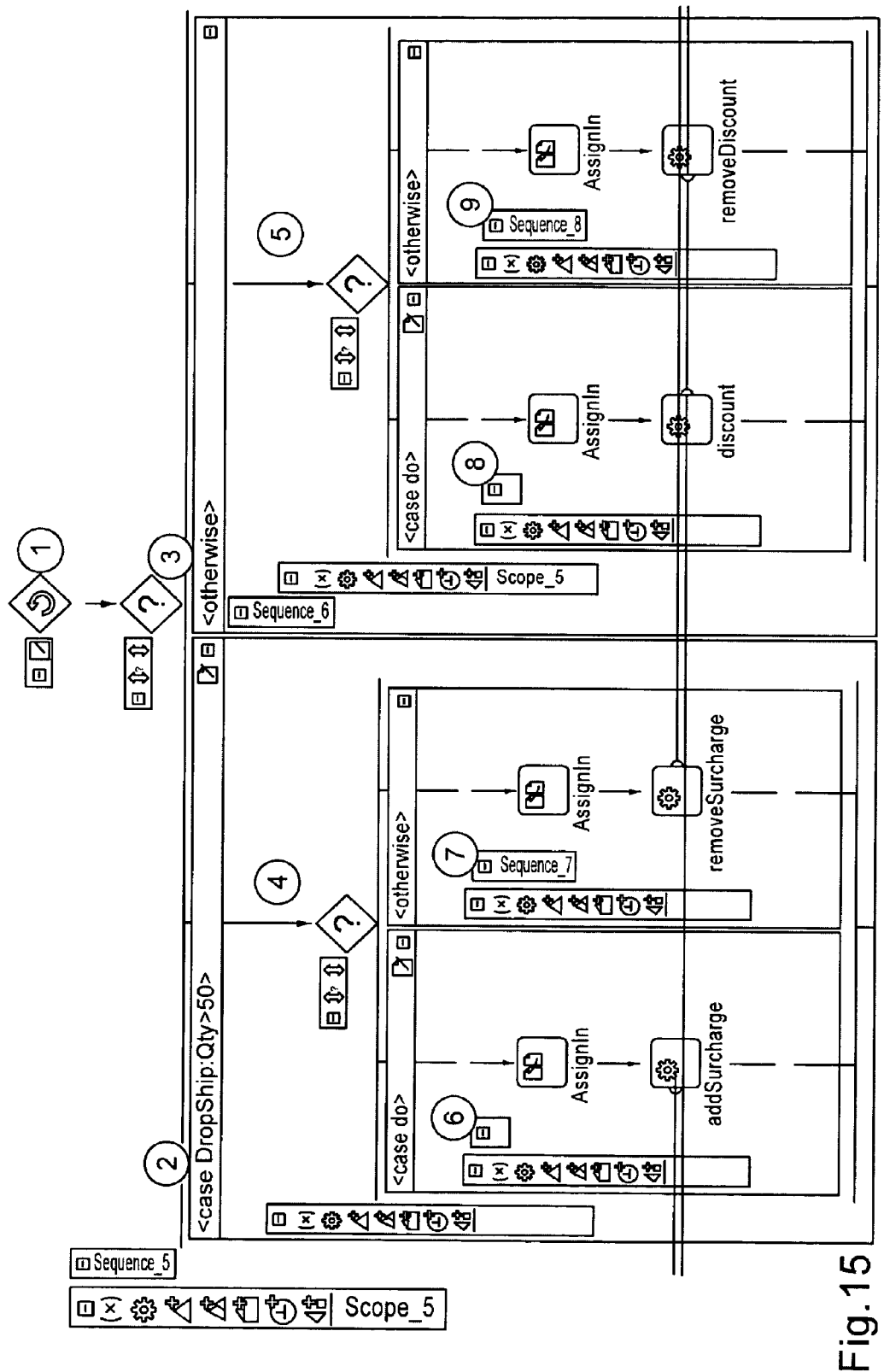
FIG. 15 is a block diagram of an extension of the switch template for change management in accordance with one embodiment.

Previously described templates can be extended with a framework scope with nested functional scopes. The framework scope is responsible for performing activities in regular and undo mode. If an orchestration process is running the first time (i.e., regular mode), the nested functional scopes perform the regular activities and exit, or they perform the undo activities (with previous state) followed by regular activities (with current state). In one embodiment, change management patterns are extracted and generic templates that can be reused are created. FIG. 14 is a block diagram of an extension of the invoke template for change management in accordance with one embodiment. FIG. 15 is a block diagram of an extension of the switch template for change management in accordance with one embodiment.

Figure 16:
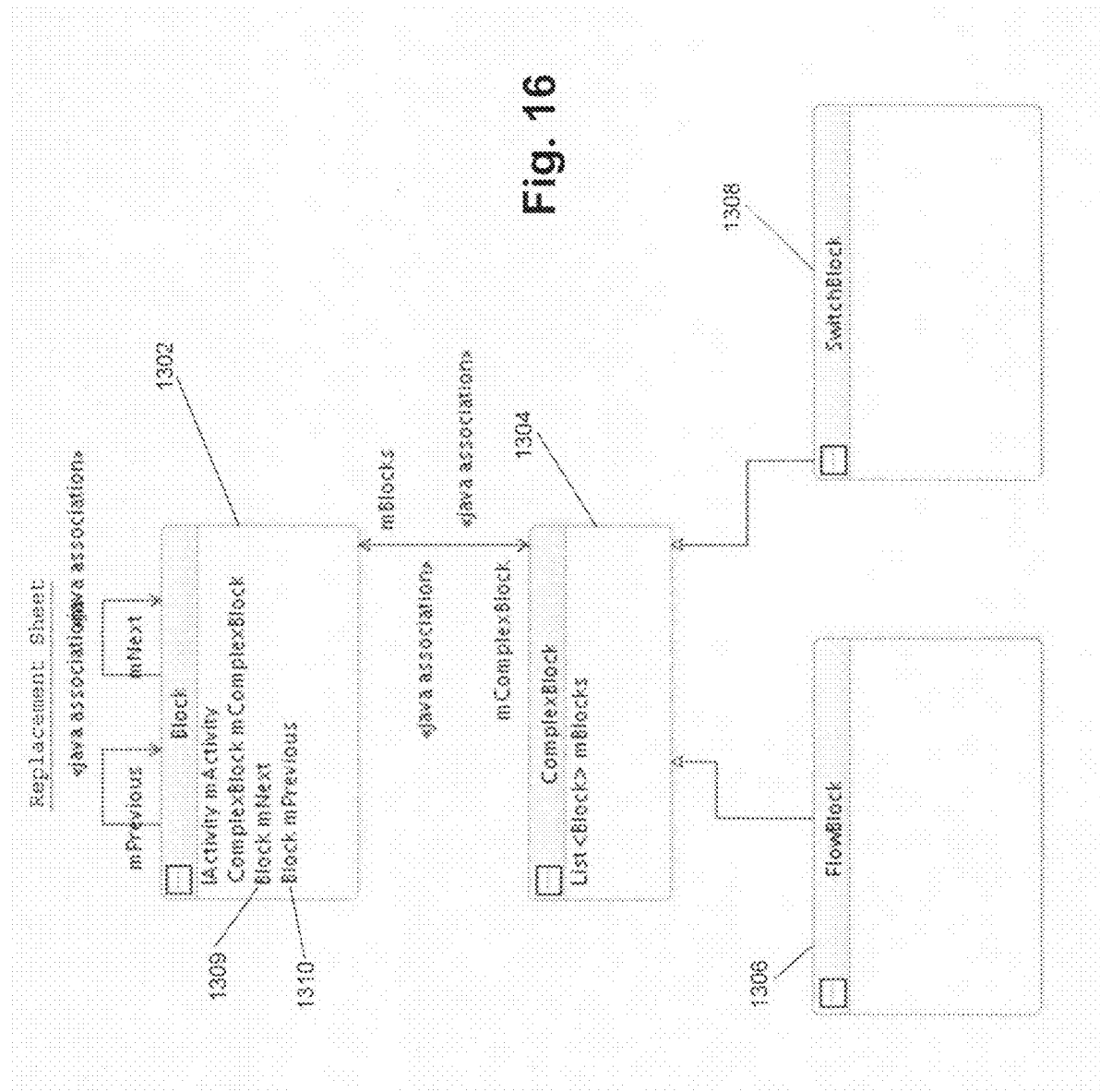
FIG. 16 is a block diagram of example abstract syntax tree ("AST") nodes in accordance with one embodiment.
Figure 17:
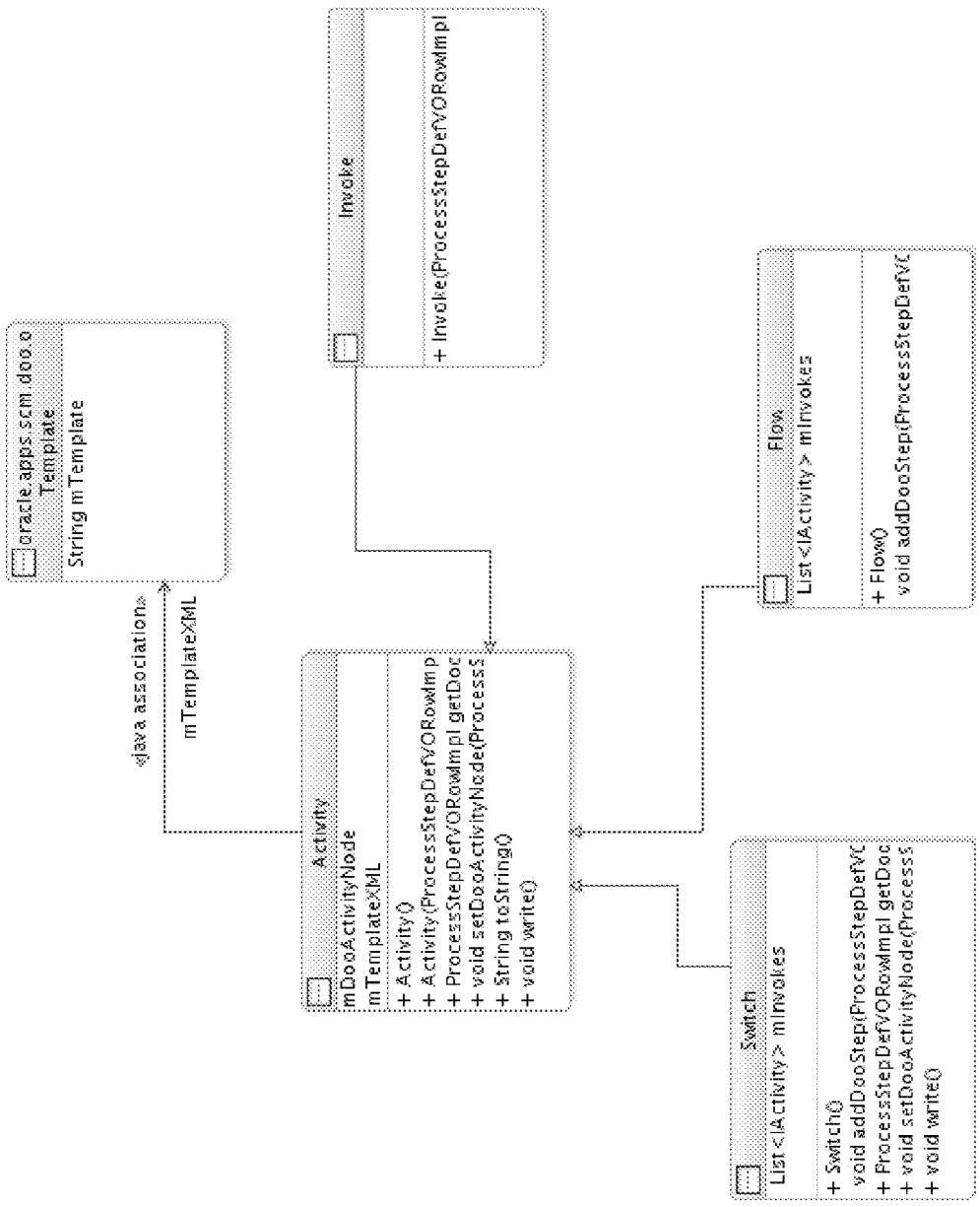
FIG. 17 is a block diagram illustrating the Java class hierarchy for DOO activity nodes in accordance with one embodiment.

AST is a hierarchal in-memory data structure that represents the BPEL process. Based on the metadata, a pre-defined template may be associated for each AST node. FIG. 16 is a block diagram of example AST nodes in accordance with one embodiment.

The nodes in the AST in one embodiment can be either a "SimpleBlock" node 1302 or "ComplexBlock" node 1304. SimpleBlock node 1302 includes only one invoke activity template. ComplexBlock node 1304 can be either a FlowBlock node 1306 or a SwitchBlock node 1308. Each SimpleBlock node also maintains pointers 1309 and 1310 to next and previous blocks. A FlowBlock can consist of several SimpleBlocks. Each SimpleBlock in a FlowBlock is embedded in a BPEL Flow activity. A SwitchBlock can consist of several SimpleBlocks. Each SimpleBlock in SwitchBlock is embedded in a BPEL switch case activity.

Each block has a reference to the appropriate DOO activity node (i.e., invoke or flow or switch). These activity nodes have a direct mapping with BPEL constructs. They also have metadata associated with them. In addition, the pre-defined templates are also associated with them. FIG. 14 is a block diagram illustrating the Java class hierarchy for DOO activity nodes in accordance with one embodiment.

FIG. 15 is a block diagram that illustrates an example of template based generation of BPEL processes in accordance with one embodiment. The example shown in FIG. 15 is for a business process for a carpet order.

Metadata 1502 illustrates the process metadata generated as a result of a user interacting with a UI such as UI 108 of FIG. 2. The metadata includes step numbers 1503, step names 1504, the next step 1505, the previous step 1506, and the condition 1507 for parallel, split, or conditional steps.

Metadata 1502 is compiled to generate an AST 1510. AST 1510 may include nodes the correspond to templates. In the example of FIG. 15, a "flow" node 1511 invokes a parallel template so that the steps of "Ship" and "Prepare Floor" can be executed in parallel. A "switch" node 1512 invokes a conditional template so that either the step of "send thank you note" or "call customer" is performed.

BPEL code 1520 is generated from AST 1510 and by using predefined corresponding templates. The process can then be executed from the BPEL code.

Figure 19:
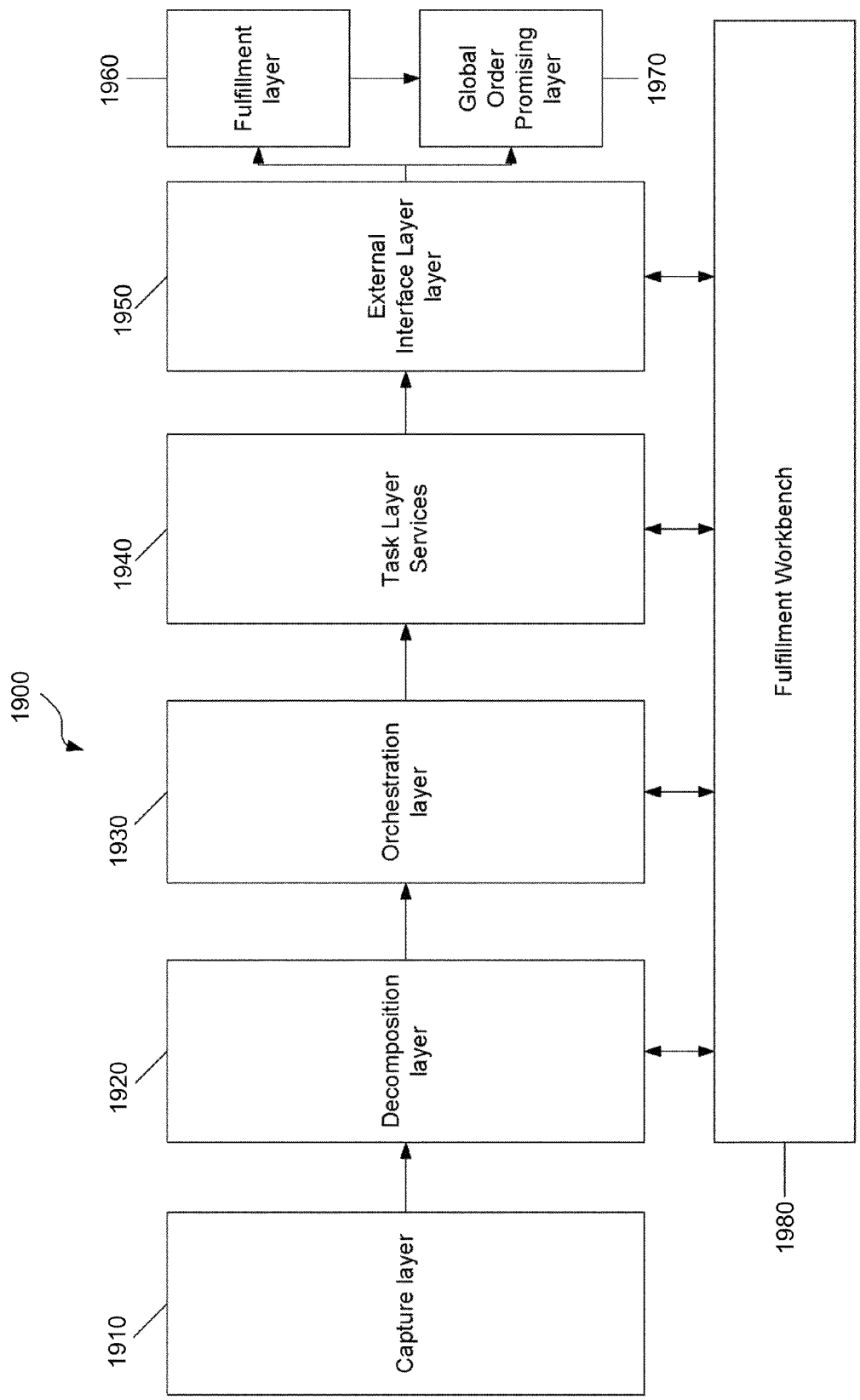
FIG. 19 illustrates an example of multiple layers of a distributed order orchestration system 1900 according to one embodiment.

FIG. 19 illustrates an example of multiple layers of a distributed order orchestration system 1900 according to one embodiment. Distributed order orchestration system 1900 includes a capture layer 1910 that can receive and capture information related to customer orders for goods and/or services across multiple channels. The order may be received via a graphical user interface, such as that of a website shopping cart, or can be received via any data entry system. The capture layer 1910 captures and forwards the order information to a decomposition layer 1920.

Order Capture systems capture the order with any necessary functional attributes that are needed to process the order, such as pricing, validation, eligibility, etc. The sales order is fed to decomposition layer 1920 in a Source Order object. The source order object is generated from a sales order object submitted by different capture systems. The source order object is in a generic format that is fed into the decomposition layer 1920.

Decomposition layer 1920 receives the order information and breaks the received order into individual purchase orders to be sent to fulfillment systems and supply-side partners for execution. Decomposition layer 1920 may include a decomposition rules workbench for setting up rules, rule sets, and transformation processes for the order capture layer 1910 may capture the order from a sales perspective. For example, a laptop computer may be sold worldwide. The laptop includes a power cord, but the customer just buys a laptop (one line on the order). That is, a sales website may want to just sell the laptop and not have the customer individually order the power cord separately. However, from a fulfillment perspective, the laptop and the power cord need to be retrieved for the order. In decomposition layer 1920, there may be a business rule that says that a laptop must have a power cord and the plug on the power cord must match the country to which the laptop is shipped. So when decomposition module 1920 is complete, the order has two lines, one with the laptop and one for the appropriate power cord. Thus, the order has been decomposed into multiple items that need to be fulfilled.

Also, decomposition layer 1920 may take the received order and translate it to the order format and order content required by the other layers of the distributed order orchestration system 1900, such as the fulfillment layer 1960. Because capture layer 1910 is capable of receiving orders in any format for compatibility purposes across different types of systems, decomposition layer 1920 may need to translate the order into a format that is compatible with and can be recognized by all the other layers and/or processes of the distributed order orchestration system 1900. Additionally, decomposition layer 1920 may provide a process launch capability to assign and launch orchestration processes for an order based on appropriate decomposition rules. For example, different orchestration processes are assigned based on parameters in the order. For example, a company may give special treatment to certain customers in terms of speed of fulfillment or shipping. For example, Gold customers may be offered expedited shipping. Also, there may be an additional step for communication with the customer. When the orders for these customers are received, they are assigned to the orchestration process that has these parameters and steps while orders for other customers may be assigned to standard processes.

Decomposition may use a canonical object model to accomplish the decoupling of data format from order capture systems. Decomposition integration processes work on a set of generic data structures called Enterprise Business Objects (EBO's). They are based on the canonical data model. This approach allows the DOO to be agnostic of participating applications and be independent of source or target applications. The model eliminates the need to map data from different applications directly to each other.

Distributed order orchestration system 1900, as illustrated in FIG. 1, further includes an orchestration layer 1930. Orchestration layer 1930 provides individual orchestration processes to manage order and/or service line items. For example, orchestration layer 1930 may provide business process management functionality to support planning of steps within a process, including step duration and calculation or recalculation of completion dates. Orchestration layer 1930 may also provide external task execution functionality to support creation, update, release, and monitoring of external tasks. External tasks are those that are carried out by the fulfillment systems. Task layer services do specific processing and then send the data to these integrated fulfillment systems. Orchestration is a sequence of task layer service invocations.

Orchestration layer 1930 may also provide for jeopardy management in order to check a promised delivery date of an order against current estimated date for completion, map to user defined thresholds, and handle or escalate conditions. Orchestration layer may further provide a process for change orders, including a support process rollback to accommodate for change order automation and modify in-flight orchestration processes for orders changed in order capture stage. Further, a projected order completion date may be provided by instantiating the orchestration process. Orchestration layer 1930 also provides a mechanism for updating an order status automatically or upon user request.

Distributed order orchestration system 1900 may further include a task layer services 1940 to provide encapsulated services used to control processing logic for each orchestration process stage. In particular, task layer services 1940 may provide task-specific business logic to wrap logic around a certain request such that the system 1900 knows what logical tasks are associated with a particular request. The steps that need to be performed in the executable process from orchestration may require tasks to be performed. For example, task layer services 1940 can provide and control processing logic for scheduling a shipment, requesting a shipment, updating install base, creating an activity, etc. The output of task layer services 1940 is a standard goods and/or service request(s) which may be provided to other layers of the system 1900, such as external interface layer 1950 or fulfillment layer 1960. In addition, task layer services 140 may receive input that can be used to update the processing logic or status.

Task layer services 1940 initiates the task, generates a message for an external system, and sends the message. The data structure that is needed to have the task performed is generated. Certain tasks may be predefined in task layer services. Also, a customer may add other tasks using a template that defines how to create a task. The message generated indicates which task should be performed by the external system. The task to be performed is an aspect of order processing that has been modeled. For example, the task may be invoicing for an order. Parameters for performing the task are also included. The message is sent to an external interface of external interface layer 1950. Task layer services 1940 transforms and sends the message to the external system layer.

Distributed order orchestration system 1900 also includes an external interface layer 1950 to translate standard request(s) and route the request(s) to external systems for processing. More specifically, external interface layer 1950 may receive the standard goods and/or services request(s) output by the task layer services 1940 and provide a single layer transform of the request(s) if needed to match the format of fulfillment systems. The transformation performed by external interface layer maps the data to the content and format required by the integrated fulfillment systems. Transformation by decomposition layer 1920 converts the data to the internal format used by system 1900. External interface layer 1950 may map the data structure from task layer services 1940 to the external format. External interface layer 1950 provides flexible routing so that request(s) are routed to specific fulfillment systems based on business rules. For example, if more than one shipping system is available for fulfillment, business rules will determine to which shipping system an individual shipping request will be sent. External interface layer 1950 may also include a transformation rules workbench that can be utilized to setup rules, rule sets, and transformation data for external routing of request(s).

The messages generated by the task layer may be in a generic format. Different external systems, however, may communicate using other formats. The external interface layer determines the format used by an external system and transforms the message. For example, metadata defined by a user may be used to determine the format to be used. In one example, mappings to what external systems call a product that was ordered are used to translate the message.

The external systems may be systems that perform the task related to processing an order, such as a scheduling system, shipping system, etc. When the task is performed, the result of the task is determined. The result may be a date when a shipment is scheduled, a date when a good is shipped, etc. The result is then sent back to external interface layer 1950.

Distributed order orchestration system 1900 may further include a global order promising layer 1970 that provides an interface, such as a graphical user interface, for scheduling and sourcing orders. In particular, in one embodiment, global order promising layer 1970 includes a sourcing broker that determines the best source for products and services associated with the order based upon a customer profile, order and supplier definitions, etc. Also, global order promising layer 1970 provides for real-time reserve and un-reserve of inventory and inventory check across distributed internal systems. The interface of global order promising layer 1970 allows for the viewing of availability and sourcing information so that a user can view the availability of and manually change the source from which an order for a good or service is being fulfilled.

A fulfillment workbench 1980 may also be provided as a user interface for order fulfillment administrators, users and supervisors to monitor and manage the flow of orders through the system 1900. In an embodiment, fulfillment workbench 1980 provides users, such as supervisors, with a mechanism to monitor order fulfillment tasks, including allowing supervisors to monitor activity load and to produce reports. Fulfillment workbench 1980 further provides a fulfillment process analysis that allows business process designers to analyze process metrics such as the number of manual interventions, the number and type of errors that occurred, the number of late orders, and the expected process duration versus the actual duration. In certain embodiments, a fulfillment system performance analysis capability is also included within the fulfillment workbench 1980 to provide reports and dashboards to enable order managers to view orders for each system and analyze performance. The fulfillment workbench may make use of graphical representations (e.g., graphs and charts) to clearly convey system status/order information to users. Because DOO system 1900 has the data reference data, it is possible to draw aggregated graphs/charts for trending analysis. Users may take actions from the fulfillment workbench as described below, such as by substituting the item ordered, splitting the quantity into multiple order lines, putting a hold on the order lines to prevent further progression, etc.

According to one embodiment, fulfillment workbench 1980 allows users to make mass order information changes related to fulfillment including making single line or mass line changes to fulfillment information (e.g., dates, etc.). Fulfillment workbench 1980 may further allow for the monitoring of orchestration processes, such as reviewing the status of orchestration processes including overall process progress, as well as status of individual tasks and corresponding fulfillment lines and people lines. Fulfillment workbench 1980, in one embodiment, includes mechanisms for maintaining order fulfillment processing and allows an order processing user to control a process associated with an order including pause, edit, cancel, etc.

In some embodiments, fulfillment workbench 1980 also provides functionality for order and task assignment. For example, fulfillment workbench 1980 may use an assignment engine to assign orders and activities to the appropriate fulfillment resource. Fulfillment workbench 1980 may include a mechanism for batch re-assignment of orders thereby allowing a supervisor to re-source a set of orders from one fulfillment system to another. Fulfillment workbench 1980 also provides for the assignment of fill rate and backorder rules that can automatically determine how to handle shortage situations. A universal in-box may be included within fulfillment workbench 1980 in order to allow users to view activities assigned to them and respond to the task.

Fulfillment workbench 1980 allows a user to view orders being processed in different layers of system 1900. A view of the status of an order may be generated from whichever layers have processed the order. This is because an end to end integrated system has been provided. Conventional order systems may have been customized solutions that did not allow for a view of different layers. By integrating layers in a format that allows generic communication, a user interface that can generate views from all the layers can be provided.

Examples of distributed order orchestration system 1900 may also include a fulfillment layer 1960. In one embodiment, fulfillment layer 1960 may be an interface to external fulfillment systems, and can be used to communicate order information and fulfillment requirements to a supplier or source of the goods and/or services associated with an order.

As disclosed, business processes can be generated by a user by interacting with a user interface, generating metadata, and generating code with the metadata and using corresponding predefined templates for certain functionality.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, causes the processor to orchestrate a business process, the orchestrating the business process comprising:
receiving from an interface a definition of the business process;
generating metadata from the definition;
generating an abstract syntax tree from the metadata, wherein the tree includes a plurality of nodes, wherein one or more of the nodes correspond to a predefined template comprising an orchestration code construct associated with a defined business process pattern, wherein the orchestration code construct comprises orchestration code that invokes one or more services;
generating executable orchestration code based on the abstract syntax tree and the predefined template; and
determining an orchestration sequence for an executable process of invoking one or more services based on the metadata;
wherein the predefined template comprises one of a composite template, a parallel template, a conditional template, a split template or a change management template.

2. The non-transitory computer readable medium of claim 1, wherein the executable orchestration code comprises business process execution language (BPEL) process code.

3. The non-transitory computer readable medium of claim 2, wherein the BPEL code comprises an Extensible Markup Language (XML) document.

4. The non-transitory computer readable medium of claim 1, wherein the definition of the business process comprises a plurality of process steps.

5. The non-transitory computer readable medium of claim 1, further comprising:
dynamically invoking the one or more services in the executable process based on the determined orchestration sequence, wherein the invoking of a service facilitates the performance of the service.

6. The non-transitory computer readable medium of claim 1, wherein the business process is an order fulfillment business process.

7. The non-transitory computer readable medium of claim 1, wherein the composite template comprises a sequence of invocations of Task Layer Services.

8. The non-transitory computer readable medium of claim 1, wherein the parallel template comprises an invocation of a sequence of steps performed in parallel.

9. The non-transitory computer readable medium of claim 1, wherein the conditional template comprises an invocation of a sequence of steps performed conditionally.

10. A computer implemented method for orchestrating a business process of an order fulfillment system, the method comprising:
receiving from an interface a definition of the business process;
generating metadata from the definition;
generating an abstract syntax tree from the metadata, wherein the tree includes a plurality of nodes, wherein one or more of the nodes correspond to a predefined template comprising an orchestration code construct associated with a defined business process pattern, wherein the orchestration code construct comprises orchestration code that invokes one or more services;
generating executable orchestration code based on the abstract syntax tree and the predefined template; and
determining an orchestration sequence for an executable process of invoking one or more services based on the metadata;
wherein the predefined template comprises one of a composite template, a parallel template, a conditional template, a split template or a change management template.

11. The method of claim 10, wherein the executable orchestration code comprises business process execution language (BPEL) process code.

12. The method of claim 11, wherein the BPEL code comprises an Extensible Markup Language (XML) document.

13. The method of claim 10, further comprising:
dynamically invoking the one or more services in the executable process based on the determined orchestration sequence, wherein the invoking of a service facilitates the performance of the service.

14. A distributed order orchestration system comprising:
a processor;
instructions stored on a computer readable medium and executed by the processor;
a user interface that receives a definition of a business process;
wherein the instructions cause the generation of metadata from the definition and the generation of an abstract syntax tree from the metadata;
wherein the tree includes a plurality of nodes, wherein one or more of the nodes correspond to a predefined template comprising an orchestration code construct associated with a defined business process pattern, wherein the orchestration code construct comprises orchestration code that invokes one or more services;
wherein the instructions generate executable orchestration code based on the abstract syntax tree and the predefined template; and
wherein the instructions determine an orchestration sequence for an executable process of invoking one or more services based on the metadata;
wherein the predefined template comprises one of a composite template, a parallel template, a conditional template, a split template or a change management template.

15. The system of claim 14, wherein the executable orchestration code comprises business process execution language (BPEL) process code.

16. The system of claim 15, wherein the BPEL code comprises an Extensible Markup Language (XML) document.

17. The system of claim 14, wherein the instructions dynamically invoke the one or more services in the executable process based on the determined orchestration sequence, wherein the invoking of a service facilitates the performance of the service.

* * * * *

UNITED STATES PATENT AND TRADEMARK OFFICE
CERTIFICATE OF CORRECTION

PATENT NO. : 8,402,064 B2
APPLICATION NO. : 12/697756
DATED : March 19, 2013
INVENTOR(S) : Addala et al.

It is certified that error appears in the above-identified patent and that said Letters Patent is hereby corrected as shown below:

On title page 2, in column 2, under item [56], "Other Publications", line 7, delete "Mangement" and insert -- Management --, therefor.

On title page 2, in column 2, under item [56], "Other Publications", line 34, delete "Mangement" and insert -- Management --, therefor.

Drawings:

On Sheet 9 of 19, in figure 9, line 1, above "Box No. 904", delete "Replacement Sheet".

On Sheet 16 of 19, in figure 16, line 1, above "<<java associationjava association>>" delete "Replacement Sheet".

Figure 18:
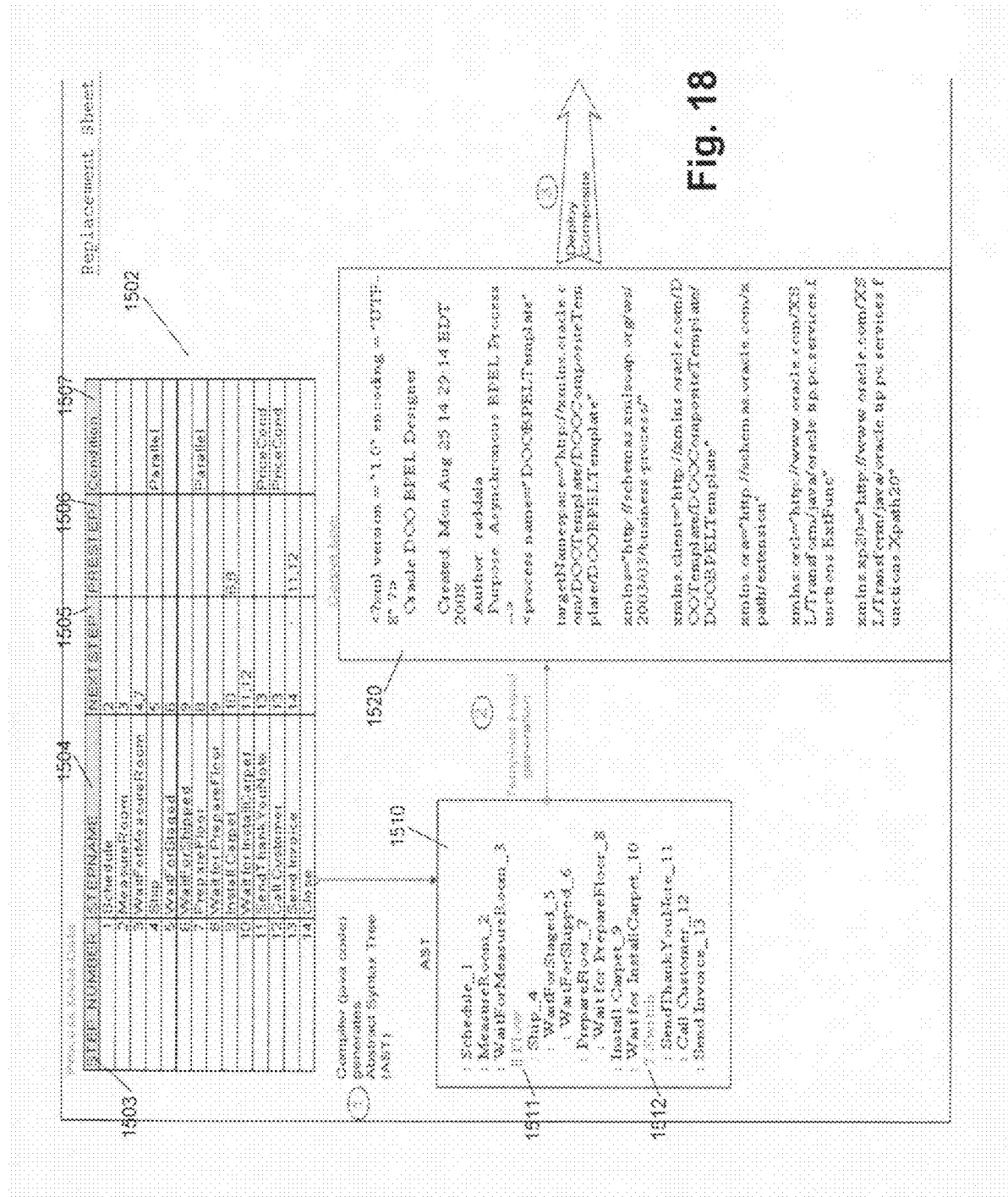
FIG. 18 is a block diagram that illustrates an example of template based generation of BPEL processes in accordance with one embodiment.

On Sheet 18 of 19, in figure 18, line 1, above "Box No. 1502" delete "Replacement Sheet".

Signed and Sealed this
Twenty-third Day of July, 2013

Teresa Stanek Rea
*Acting Director of the United States Patent and Trademark Office*